United States Patent
Du et al.

(10) Patent No.: US 11,734,271 B2
(45) Date of Patent: Aug. 22, 2023

(54) DATA QUERY METHOD, APPARATUS AND DEVICE

(71) Applicant: Alibaba Group Holding Limited, Grand Cayman (KY)

(72) Inventors: Jingbing Du, Hangzhou (CN); Xiang Zhou, Hangzhou (CN); Wenbo Ma, Hangzhou (CN); Jiannan Ji, Hangzhou (CN); Chaoqun Zhan, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 433 days.

(21) Appl. No.: 16/932,596

(22) Filed: Jul. 17, 2020

(65) Prior Publication Data

US 2020/0349160 A1    Nov. 5, 2020

Related U.S. Application Data

(63) Continuation of application No. PCT/CN2019/071357, filed on Jan. 11, 2019.

(30) Foreign Application Priority Data

Jan. 19, 2018    (CN) .......................... 201810053977.8

(51) Int. Cl.
*G06F 15/16* (2006.01)
*G06F 16/2453* (2019.01)
(Continued)

(52) U.S. Cl.
CPC ...... *G06F 16/24539* (2019.01); *G06F 9/4881* (2013.01); *G06F 16/2282* (2019.01); *G06F 16/24552* (2019.01); *G06F 16/288* (2019.01)

(58) Field of Classification Search
None
See application file for complete search history.

(56) References Cited

U.S. PATENT DOCUMENTS 6,571,259 B1    5/2003   Zheng et al.
6,820,085 B2   11/2004   Nishizawa et al.
(Continued)

FOREIGN PATENT DOCUMENTS

CN    101207570 A    6/2008
CN    101873475 A   10/2010
(Continued)

OTHER PUBLICATIONS

Extended European Search Report dated Jul. 21, 2021 for European Patent Application No. 19741895.7, 8 pages.
(Continued)

*Primary Examiner* — Alex Gofman
(74) *Attorney, Agent, or Firm* — Lee & Hayes, P.C.

(57) ABSTRACT

A method including receiving a query request sent by a client; determining resource occupation information of a data set corresponding to the query request; if determining, according to the resource occupation information, to cache the query request, then acquiring the data set corresponding to the query request, and storing the data set in an external memory; and reading the data set from the external memory and sending the data set to the client. By using the method, returning multiple data sets to a client within a short period of time is avoided, thus reducing the occupation of CPU resources, memory resources and network resources, avoiding client query timeout or failure, and improving the usage experience of uses.

19 Claims, 13 Drawing Sheets

(51) Int. Cl.
*G06F 16/22* (2019.01)
*G06F 16/2455* (2019.01)
*G06F 16/28* (2019.01)
*G06F 9/48* (2006.01)

(56) References Cited

U.S. PATENT DOCUMENTS

| | | | |
|---|---|---|---|
| 6,931,408 | B2 | 8/2005 | Adams et al. |
| 7,290,015 | B1 | 10/2007 | Singhal et al. |
| 7,421,562 | B2 | 9/2008 | Bhatt et al. |
| 9,251,210 | B2 | 2/2016 | Chaudhry et al. |
| 9,690,810 | B2 | 6/2017 | Wester et al. |
| 2003/0101231 | A1 | 5/2003 | Kausik et al. |
| 2006/0218205 | A1 | 9/2006 | Shimizu et al. |
| 2008/0282247 | A1 | 11/2008 | Kreuder |
| 2009/0049013 | A1 | 2/2009 | Kumbi et al. |
| 2010/0125590 | A1 | 5/2010 | Puranik et al. |
| 2014/0280034 | A1* | 9/2014 | Harris ............... G06F 16/951 707/718 |
| 2014/0317084 | A1* | 10/2014 | Chaudhry ....... G06F 16/24552 707/713 |
| 2015/0242464 | A1* | 8/2015 | Nguyen ............... G06F 11/30 707/721 |
| 2018/0336199 | A1* | 11/2018 | Ignatyev ............ G06F 9/4494 |
| 2018/0357304 | A1* | 12/2018 | Balasubrahmanian ............... G06F 16/9574 |
| 2019/0065775 | A1* | 2/2019 | Klucar, Jr. ....... G06F 16/24552 |

FOREIGN PATENT DOCUMENTS

| | | |
|---|---|---|
| CN | 101964816 A | 2/2011 |
| CN | 102609488 A | 7/2012 |
| CN | 103853727 A | 6/2014 |
| CN | 104462194 A | 3/2015 |
| CN | 105354193 A | 2/2016 |
| CN | 106372156 A | 2/2017 |

OTHER PUBLICATIONS

Translation of International Search Report dated Apr. 11, 2019, from corresponding PCT Application No. PCT/CN2019/071357, 2 pages.
Translation of Written Opinion dated Apr. 11, 2019, from corresponding PCT Application No. PCT/CN2019/071357, 3 pages.
Translation of CN Office Action dated Nov. 21, 2022, from corresponding CN Application No. 201810053977.8, 7 pages.
Translation of CN Search Report dated Nov. 14, 2022, from corresponding CN Application No. 201810053977.8, 1 page.
Translation of Office Action dated Apr. 24, 2023, from corresponding CN Application No. 201810053977.8, 14 pages.
The European Office Action dated Apr. 17, 2023 for European patent application No. 19741895.7, a foreign counterpart of U.S. Appl. No. 16/932,596, 8 pages.
Fielding, et al., "Hypertext Transfer Protocol (HTTP/1.1): Caching; rfc7234.txt", Internet Engineering Task Force (IETF), Standard, Internet Society (ISOC), Geneva, Switzerland, Jun. 7, 2014, 43 pages.
Translated the Japanese Office Action dated Mar. 14, 2023 for Japanese patent application No. 2020-539715, a counterpart foreign application of U.S. Appl. No. 16/932,596, 9 pages.

* cited by examiner

DATA QUERY METHOD, APPARATUS AND DEVICE

CROSS REFERENCE TO RELATED APPLICATION

This application claims priority to and is a continuation of PCT Patent Application No. PCT/CN2019/071357, filed on 11 Jan. 2019 and entitled "DATA QUERY METHOD, APPARATUS AND DEVICE," which claims priority to Chinese Patent Application No. 201810053977.8, filed on 19 Jan. 2018 and entitled "DATA QUERY METHOD, APPARATUS AND DEVICE," which are incorporated herein by reference in their entirety.

TECHNICAL FIELD

The present disclosure relates to the field of Internet technology, and, more particularly, to data query methods, apparatuses and devices.

BACKGROUND

An analytical database is a real-time computing engine that can perform analysis and statistical tasks for massive amounts of data in any dimension, which supports high concurrency, low latency (millisecond response), real-time online analysis, massive data query, and many other functions. In addition, an analytical database can store a large amount of data. After receiving a query request sent by a client, it can query the data corresponding to the query request, and return the queried data to the client.

However, in certain scenarios (such as map data query, data profiling query, and the like), multiple query requests may be received within a short period of time (that is, the number of concurrent requests is very high during a short period of time), and the amount of data corresponding to each query request is also very large. In such a case, multiple query requests need to be processed in a very short period of time, and a large amount of data is returned for each query request, resulting in abnormalities in CPU (Central Processing Unit) resources, memory resources, network bandwidth, etc. Such a situation would result in client query timeout or even failure, which will affect the user experience.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a data query method, the method is applied to a front-end server, and the method comprises:
receiving a query request sent by a client;
determining resource occupation information of a data set corresponding to the query request;
in response to determining to cache the query request according to the resource occupation information, obtaining the data set corresponding to the query request, and storing the data set in an external memory;
reading the data set from the external memory and sending the data set to the client.

The present disclosure further provides a data query device, the device is applied to a front-end server, and the device comprises:
a receiving module, which is used for receiving a query request sent by a client;
a determining module, which is used for determining resource occupation information of a data set corresponding to the query request;
an obtaining module, which is used for, in response to determining to cache the query request according to the resource occupation information, obtaining the data set corresponding to the query request;
a storing module, which is used for storing the data set in an external memory;
a sending module, which is used for reading the data set from the external memory and sending the data set to the client.

The present disclosure further provides a front-end server, the front-end server comprises:
a receiver, which is used for receiving a query request sent by a client;
a processor, which is used for determining resource occupation information of a data set corresponding to the query request; in response to determining to cache the query request according to the resource occupation information, obtaining the data set corresponding to the query request; storing the data set in an external memory; and reading the data set from the external memory;
a transmitter, which is used for sending the data set to the client.

Based on the technical solutions provided above, in the example embodiments of the present disclosure, after a query request is received, instead of directly sending the data set to the client, the query request and data set are first stored in an external memory. In this way, the data set corresponding to the query request is cached locally, thereby avoiding processing multiple query requests within a short period of time. That is, avoiding returning multiple data sets to the client within a short period of time, thereby reducing the occupation of CPU resources, memory resources, and network bandwidth, avoiding client query timeout or even failure, and improving user experience.

BRIEF DESCRIPTION OF THE DRAWINGS

In order to more clearly explain the technical solutions of the example embodiments of the present disclosure, the drawings for the example embodiments of the present disclosure will be briefly described. Obviously, the drawings of the following description only represent some example embodiments of the present disclosure. For a person of ordinary skill in the art, other drawings can also be obtained based on these drawings of the example embodiments of the present disclosure.

DETAILED DESCRIPTION

The terminology used in the present disclosure is for the purpose of describing particular example embodiments only, and does not limit the present disclosure. The singular forms "a," "said" and "the" used in the present disclosure and claims are also intended to include a plural form unless the context clearly indicates otherwise. It should also be understood that the term "and/or" as used herein refers to any or every possible combination including one or more of the listed items.

It should be understood that although the terms first, second, third, etc. may be used herein to describe various pieces of information in the present disclosure, the information should not be limited to these terms. These terms are only used to distinguish the same type of information from each other. For example, without departing from the scope of the present disclosure, the first information may also be referred to as the second information. Similarly, the second information may also be referred to as the first information, depending on context. In addition, the word "if" may be interpreted as "when" or "while" or "in response to a determination."

The example embodiments of the present disclosure propose a data query method, which can be applied to a system including a client, a front-end server (also referred to as a front node), a computing server (also referred to as a compute node), and a database, such as a system used to implement an analytical database (such as the Analytic DB, which is referred to as ADS). Certainly, other servers may also be included, such as a resource scheduling server, which is not limited in the present disclosure.

Figure 1:
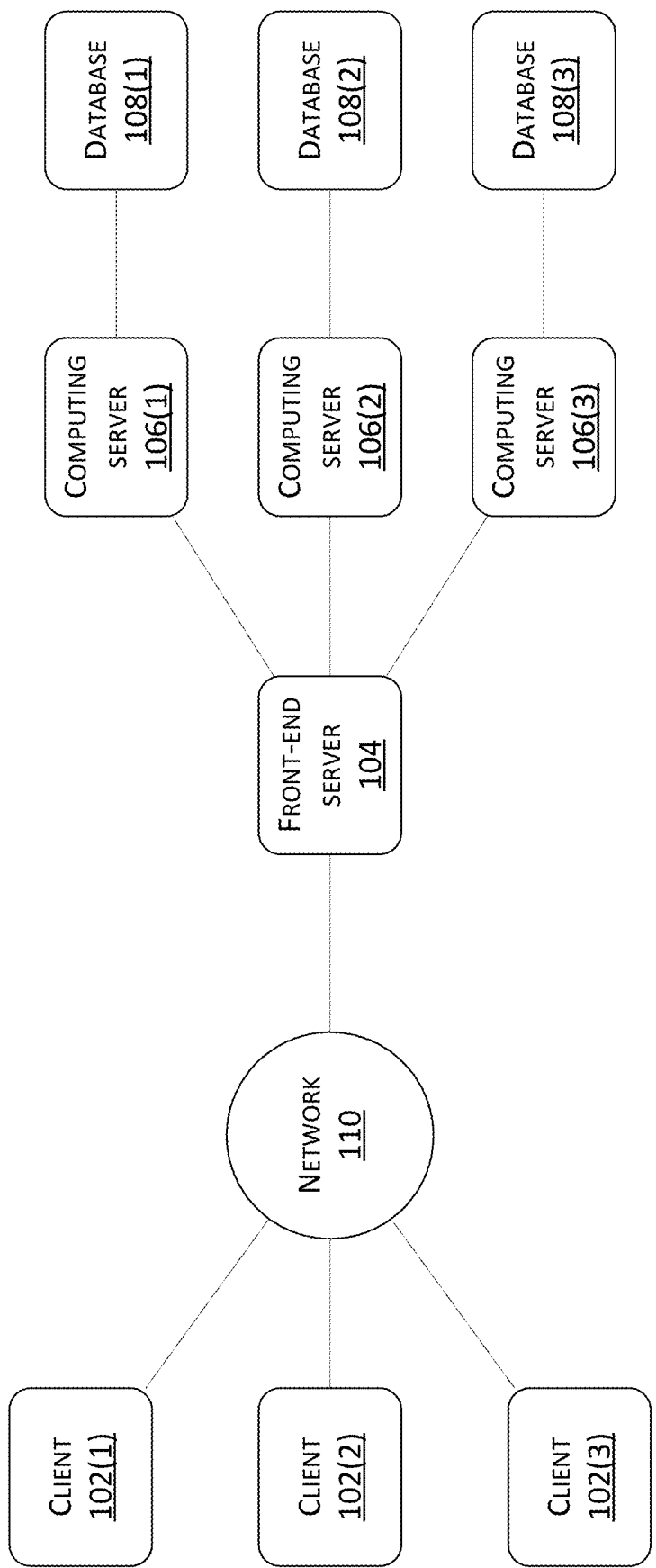
FIG. 1 is a schematic diagram of a system structure in an example embodiment of the present disclosure.

Referring to FIG. 1, which is a schematic diagram of an application scenario according to an example embodiment of the present disclosure, the number of clients, front-end servers, computing servers, and databases may be one or more. In FIG. 1, 3 clients 102(1), 102(2), 102(3), 1 front-end server 104, 3 computing servers 106(1), 106(2), 106(3), and 3 databases 108(1), 108(2), 108(3) are used in an example. These computing devices are connected via a network 110. Certainly, the number of clients, front-end servers, computing servers, and databases can also be other values, which is not limited in the present disclosure.

An analytical database is a real-time calculation engine, which can perform analysis and statistical tasks with massive data in any dimension, and support high concurrency, low latency, real-time online analysis, massive data query, and other functions.

The client 102 is used to query data from the database 108, such as an APP (Application) on a terminal device (such as a PC (Personal Computer), a notebook computer, a mobile terminal, and the like), or a browser on the terminal device. There is no limitation on the specific type of the client.

The database 108 is used to store various types of data, and can provide the data stored in the database to the client 102. As for the specific types of data stored in the database 108, there is no limitation in the example embodiments of the present disclosure; they can be, such as user data, data, map data, video data, image data, audio data, and the like.

The front-end server 104 is used to receive a query request sent by the client 102, and perform SQL (Structured Query Language) parsing on the query request, use the SQL parsing result to generate a scheduling request, and then send the scheduling request to a computing server 106. The scheduling request is used to request the data corresponding to the query request. It further receives the data returned by the computing server and then sends the data to the client.

The computing server 106 is used to receive the scheduling request sent by the front-end server 104, use the scheduling request to read the data corresponding to the scheduling request from the database 108, and then send the data to the front-end server.

Figure 2A:
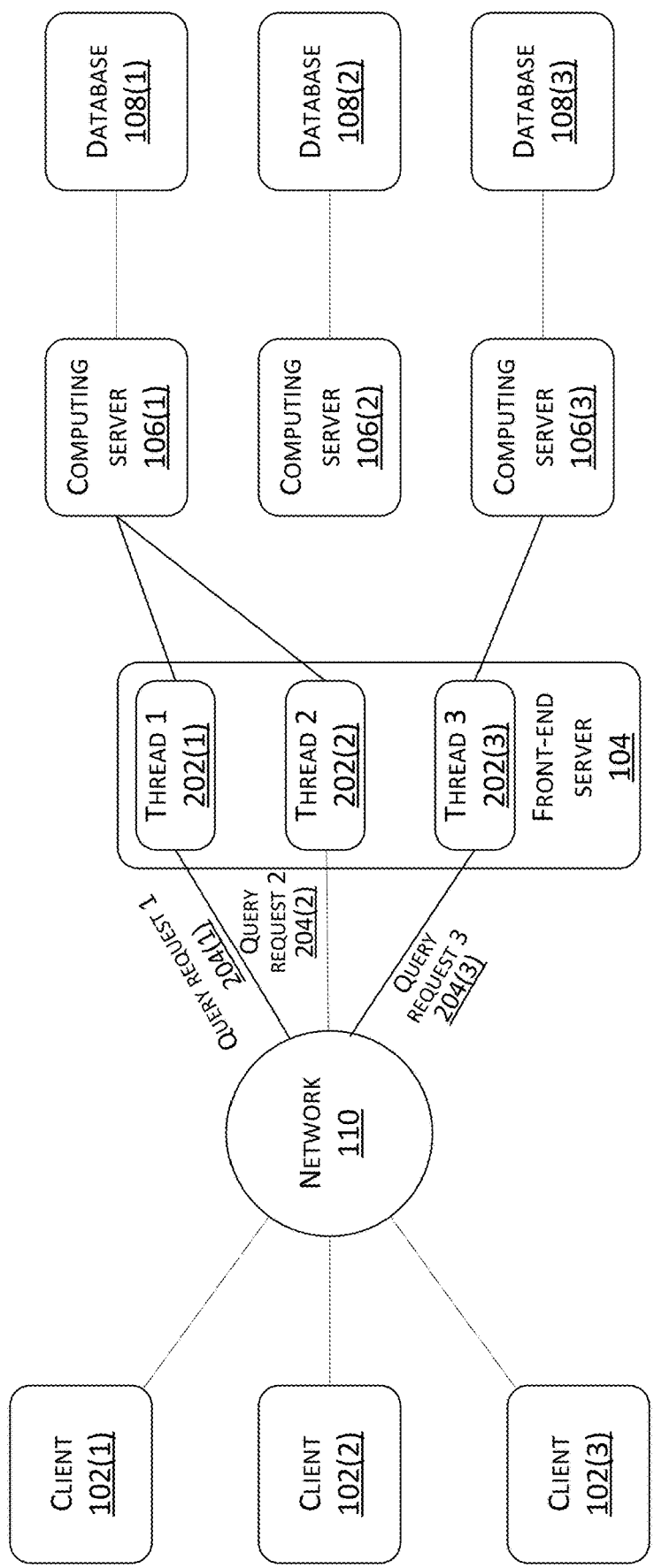
FIG. 2A is a schematic diagram of query request processing in an example embodiment of the present disclosure.

As shown in FIG. 2A, the front-end server 104 starts multiple threads including thread 1 202(1), thread 2 202(2), thread 3 202(3). Each thread 202 is used to process a query request. For example, after receiving a query request 1 204(1), the front-end server 104 starts a thread 1 202(1) for the query request 1 204(1), and the thread 1 202(1) processes the query request 1 204(1), that is, performs the operations such as sending a scheduling request to the computing server 106(1) and sending the data returned by the computing server 106(1) to the client 102(1). After sending the data to the client 102(1), the thread 1 202(1) is released. When the thread 1 202(1) is working, if the front-end server 104 receives a query request 2 204(2), a thread 2 202(2) is started for the query request 2 204(2), and the thread 2 202(2) processes the query request 2 204(2). When both the thread 1 202(1) and the thread 2 202(2) are working, if the front-end server 104 receives a query request 3 204(3), a thread 3 202(3) is then started for the query request 3 204(3), and the thread 3 202(3) thus processes the query request 3 204(3), and so on.

When the front-end server 104 receives multiple query requests 204 within a short period of time (that is, the number of concurrencies is high), the front-end server 104 may start multiple threads 202, and the multiple threads 202 then process the multiple query requests 204. In this case, if the amount of data corresponding to each query request 204 is large, a large amount of data needs to be returned for each query request 204, resulting in abnormalities in CPU resources, memory resources, network bandwidth, and the like, resulting in a decrease in the processing performance of the front-end server 104, and further causing the problems of client query timeout or even failure, which negatively affect the user experience. For example, when a large amount of data needs to be returned for each query request 204, these data will occupy a large amount of memory resources. As a result, there may be problems such as memory overflow or frequent memory recycling, resulting in query timeout or failure.

Figure 2B:
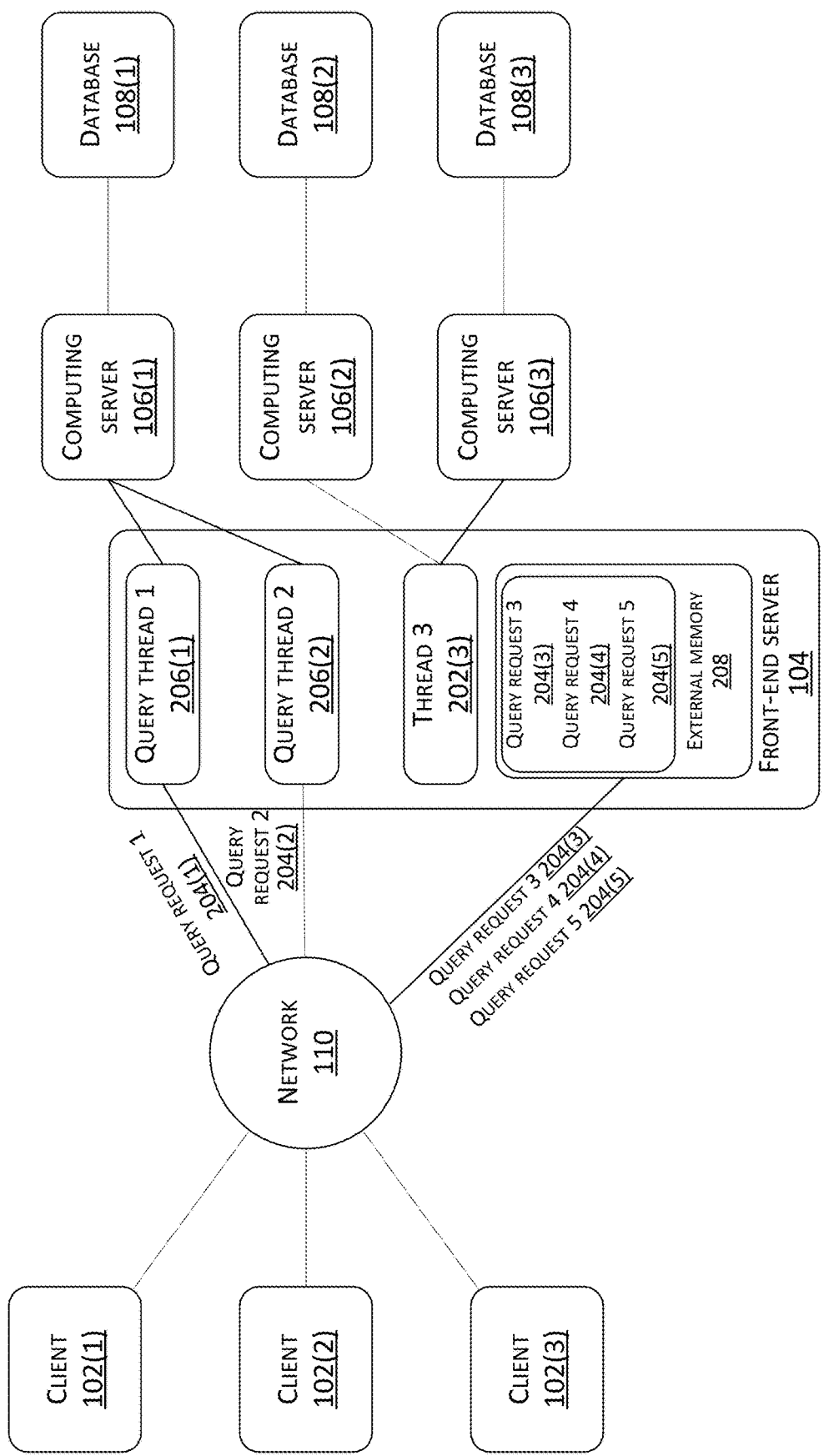
FIG. 2B is a schematic diagram of query request processing in another example embodiment of the present disclosure.

To address the foregoing problems, in the example embodiments of the present disclosure, as shown in FIG. 2B, the front-end server 104 starts multiple query threads 206, and each query thread 206 is used to process a query request 204 respectively. In addition, the front-end server 104 starts a scheduling thread, which is used to process a query request 204 in an external memory 208 sequentially. For example, after receiving a query request 1 204(1), the front-end server 104 starts the query thread 1 206(1) for the query request 1 204(1), and the query thread 1 206(1) processes the query request 1 204(1). When the query thread 1 206(1) is working, if the front-end server 104 receives a query request 2 204(2), a query thread 2 206(2) is started for the query request 2 204(2), and the query thread 2 206(2) thus processes the query request 2 204(2). When both the query thread 1 204(1) and the query thread 2 204(2) are working, if the front-end server 104 receives a query request 3 204(3), a query request 4 204(4), a query request 5 204(5), and the like, no query thread 206 is further started for these query requests, but these query requests 204(3), 204(4), and 204(5) are stored in the external memory 208.

The front-end server 104 may start a scheduling thread (not shown in FIG. 2B). The scheduling thread processes the query request 3 204(3) in the external memory 208 first. After the query request 3 204(3) processing is completed, the scheduling thread processes the query request 4 204(4) in the external memory 208. After the query request 4 204(4) processing is completed, the scheduling thread then processes the query request 5 204(5) in the external memory 208, and so on.

In the case where the front-end server 104 receives multiple query requests 204 within a short period of time (that is, the number of concurrencies is high), the number of query threads 206 to be started is controlled, which avoids processing multiple query requests 204 within a short period of time. In this way, the present disclosure avoids returning a large amount of data to the client 102 within a short period of time, thereby reducing the occupation of CPU resources, memory resources, and network bandwidth, improving the processing performance, avoiding client query timeout or failure, thereby improving the user experience.

Figure 3:
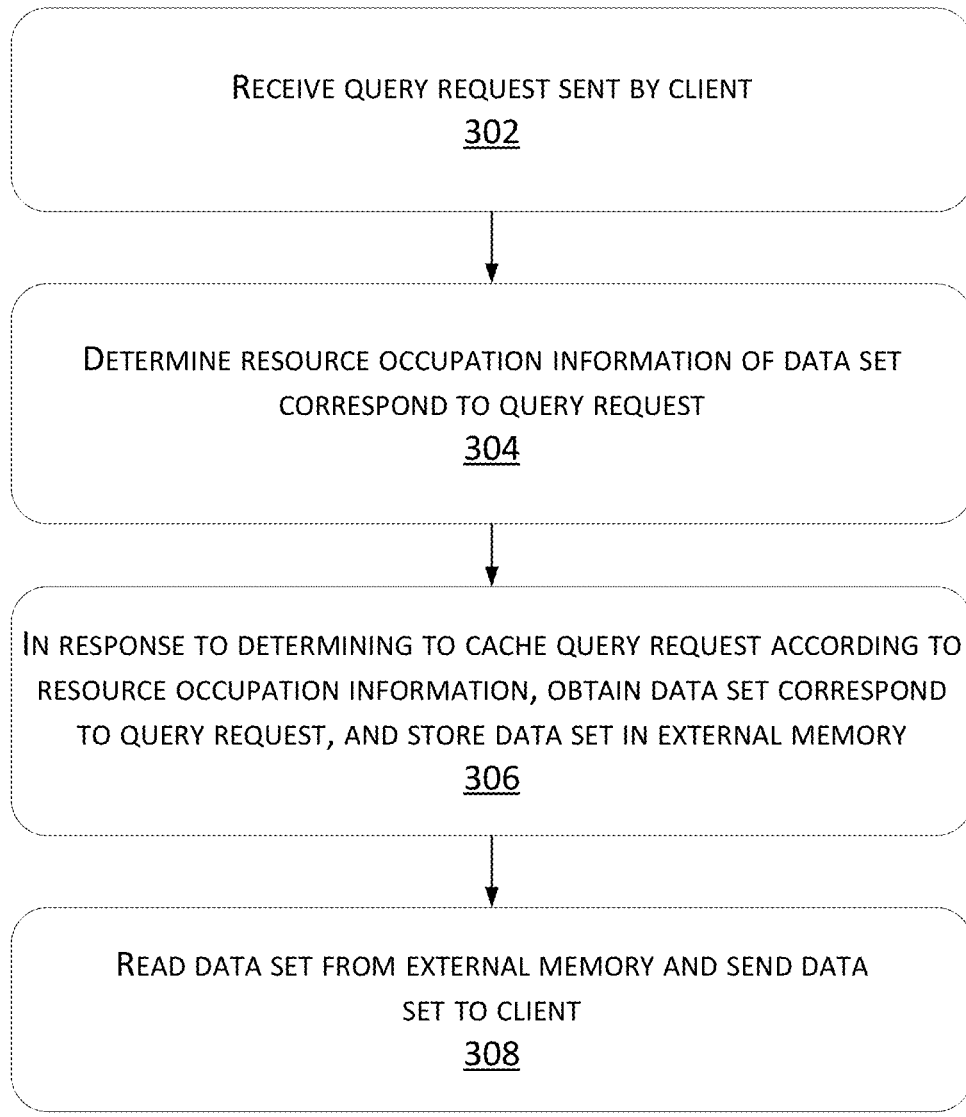
FIG. 3 is a flowchart of a data query method in an example embodiment of the present disclosure.

In the above application scenario, referring to FIG. 3, which is a flowchart of the data query method proposed in one example embodiment of the present disclosure, this method can be applied to a front-end server, and the method can include the following steps:

Step 302 includes receiving a query request sent by a client;

Step 304 includes determining resource occupation information of a data set corresponding to the query request;

Step 306 includes, in response to determining to cache the query request according to the resource occupation information, obtaining the data set corresponding to the query request, and storing the data set in an external memory;

Step 308 includes reading the data set from the external memory and sending the data set to the client.

In an example, the above execution order is just an example given for the convenience of description. In practical applications, the execution order of the steps may also be changed, and there is no limitation on the execution order in the present disclosure. Moreover, in other example embodiments, the steps of the corresponding method are not necessarily performed in the order shown and described in the present description. The method may include more or fewer steps than as described in the present description. In addition, the individual steps described in the present description may be divided into multiple steps in the description of other example embodiments. The multiple steps described in the present description may be combined into a single step in the description of other example embodiments.

For step 302, in one example, when a client requests data, a query request may be sent, and a front-end server receives the query request sent by the client, and then the query request is used to request data in the database.

For step 304, after determining the resource occupation information of the data set corresponding to the query request, if it is determined that the query request is not to be cached according to the resource occupation information, the data set corresponding to the query request can be obtained, and the data set is then sent to the client without caching the data set.

For step 306, the process of obtaining the data set corresponding to the query request and storing the data set in an external memory may include, but is not limited to: storing the context information corresponding to the query request in an external memory, and then reading the context information from the external memory, using the context information to obtain the data set corresponding to the query request, and then storing the data set in the external memory.

For step 306, in an example, after receiving the query request, the front-end server may directly store the context information corresponding to the query request in the external memory; alternatively, the front-end server may store the context information corresponding to the query request in the external memory only when certain specific conditions are met.

A storage medium for storing the context information and the data set corresponding to the query request (for the convenience of description, the data finally returned to the client is referred to as the data set, and the data set will be further described in detail in the following sections of the present disclosure) is referred to as an external memory, which is not an internal memory (or memory), so as to avoid occupying the resources of internal memory. The external memory refers to a storage device other than the internal memory and the CPU cache. It may include, but is not limited to: a hard disk, a floppy disk, an optical disk, a U disk, and the like. There is no restriction on the type of the external memory, as long as it is different from the internal memory.

The context information corresponding to the query request may include, but is not limited to, one or any combination of the following: a query identifier corresponding to the query request, receiving time of the query request, user information corresponding to the query request (such as the client's IP address, etc.), a predicted amount of data corresponding to the query request, the query request. See Table 1 for an example of the context information corresponding to the query request, which is not limited in the present disclosure.

TABLE 1

| Query identifier | Receiving time | User information | Predicted amount of data | Query request |
|---|---|---|---|---|
| 101 | 2017.11.6.14.16.10 | IP address A | 25.6M | query request 1 |
| ... | ... | ... | ... | ... |

The query request can correspond to a query identifier, which can be unique, that is, different query requests have different query identifiers. Through the query identifier (such as the query identifier 101 shown in Table 1), the front-end server can obtain the contents such as the receiving time, user information, predicted amount of data, query request, and so on.

The receiving time refers to the time when the front-end server receives the query request, that is, when the front-end server receives the query request, it may record the receiving time of the query request, such as 2017.11.6.14.16.10, and the like.

The user information may include, but is not limited to: the client's IP address (the source IP address of the query request), the user identity information (such as user name, password, etc., which can be obtained from the query request), and there is no restriction on this in the present disclosure.

The predicted amount of data refers to the determined data amount of the data set corresponding to the query request (that is, the data size of the data set). For example, after receiving a query request 1, the front-end server actually has not yet obtained the data set corresponding to the query request 1, so it can be first determined for the data amount of the data set corresponding to the query request 1. The amount of data herein is a predicted amount of data, and the determination process will be described in the subsequent sections.

The query request is the query request received by the front-end server, including all the content carried by the query request.

Figure 4A:
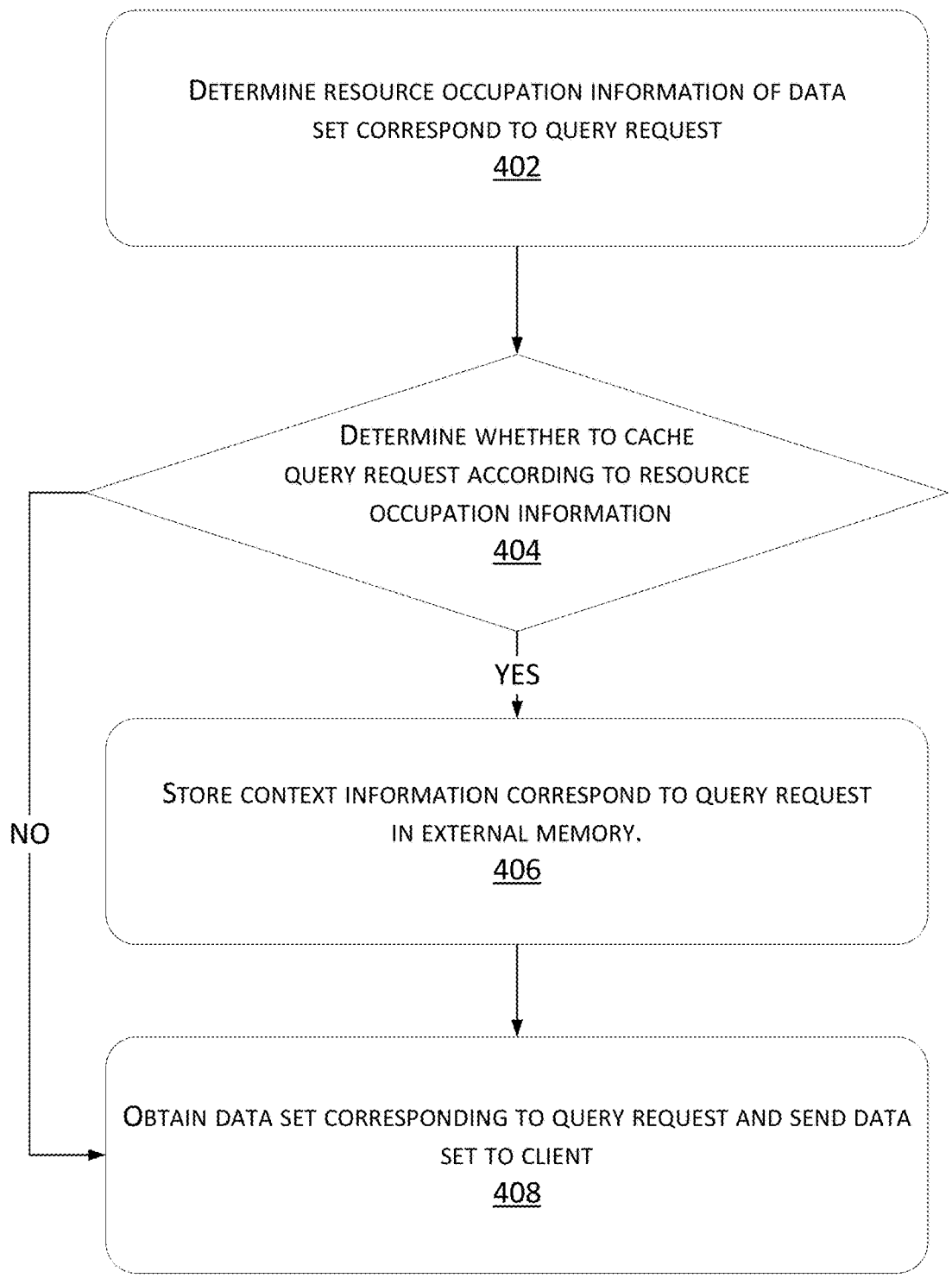
FIG. 4A is a flowchart of a data query method in another example embodiment of the present disclosure.

In an example, the process of "the front-end server storing the context information corresponding to the query request in an external memory when certain conditions are met" can include, but is not limited to, the following situations:

Case 1, as shown in FIG. 4A, is another flowchart of the data query method. The method includes:

Step 402 includes determining resource occupation information of the data set corresponding to the query request.

Step 404 includes determining whether to cache the query request according to the resource occupation information.

If yes, go to perform step 406; if no, go to perform step 408.

Step 406 includes storing the context information corresponding to the query request in the external memory.

Further, the step of reading context information from external memory is performed. The context information is used to obtain the data set corresponding to the query request, and the data set is then stored in the external memory.

Step 408 includes obtaining the data set corresponding to the query request and sending the data set to the client.

For step 304 or step 402, in an example, the process of "determining the resource occupation information of the data set corresponding to the query request" may include, but is not limited to: querying a mapping table through a data identifier carried in the query request, and obtaining the resource occupation information of the data set corresponding to the data identifier; in this case, the mapping table is used to record the corresponding relationship between data identifier and resource occupation information. Further, in order to generate the mapping table, after obtaining the data set corresponding to the query request, the front-end server may record the corresponding relationship between the data identifier carried by the query request and the resource occupation information of the data set in the mapping table.

For example, after receiving the query request for data set A for the first time, the front-end server queries the mapping table through the data identifier carried in the query request (such as data identifier 1 corresponding to data set A). Since the resource occupation information corresponding to the data identifier 1 does not exist in the mapping table, the front-end server determines that the resource occupation information is the default resource occupation information 1 (the resource occupation information 1 is pre-configured based on experience, when the resource occupation information corresponding to the data identifier does not exist in the mapping table, the resource occupation information 1 is determined).

Further, after the front-end server obtains the data set corresponding to the query request (in the subsequent sections, it will be introduced about how to obtain the data set corresponding to the query request), the resource occupation information of the data set can be obtained. Assuming that the resource occupation information is resource occupation information A, the corresponding relationship between data identifier 1 and resource occupation information A can be recorded in the mapping table. As shown in Table 2, it is an example of the mapping table.

TABLE 2

| Data identifier | Resource occupation information |
|---|---|
| data identifier 1 | resource occupation information A |
| . . . | . . . |

After the front-end server receives the query request for requesting data set A again (such as the second time, the third time, etc.), by querying the mapping table with the data identifier 1 carried in the query request, resource occupation information A corresponding to data identifier 1 can be obtained. That is, the determination result is the resource occupation information A. After obtaining the data set corresponding to the query request, the front-end server can count the resource occupation information of the data set. If the current counting result is the same as the resource occupation information A, the resource occupation information A is kept unchanged; if the current counting result is different from the resource occupation information A, the resource occupation information A will be replaced with the current counting result.

In an example, the above resource occupation information may include, but is not limited to, one or any combination of the following: a memory occupancy rate, a CPU occupancy rate, an amount of data of the data set (that is, the size of the data set).

The process of "counting the resource occupation information of the data set" may include: after the data set corresponding to the query request is obtained, the memory occupancy rate corresponding to the data set can be counted, that is, how much memory is occupied by the data set, such as 5%, etc., which means that this data set takes up 5% of the total memory. After the data set corresponding to the query request is obtained, the CPU usage corresponding to the data set can also be counted, that is, how much CPU is occupied by the data set, such as 5%, etc., indicating that the data set occupies 5% of the total CPU. After the data set corresponding to the query request is obtained, the amount of data corresponding to the data set can be counted, that is, the size of the data set.

For step 404, in an example, the process of "determining whether to cache the query request according to the resource occupation information" may include, but is not limited to the following: if a sum of the resource occupation information and the currently occupied resources of the front-end server is greater than or equal to a resource threshold, the query request can be determined to be cached; or, if the sum of the resource occupation information and the currently occupied resources of the front-end server is less than the resource threshold, it may be determined that the query request is not to be cached.

Assuming that resource occupation information includes the memory occupancy rate, the CPU occupancy rate, and the amount of data of the data set, the resource threshold may include a memory threshold (such as 85%), a CPU threshold (such as 90%), an amount of data threshold (such as 200 M). The front-end server can count the current memory usage (such as 60%, indicating that 60% of the memory is currently used), current CPU usage (such as 60%, indicating that 60% of the CPU is currently used), and current bandwidth usage (such as 100 M, indicating that 100 M bandwidth is currently occupied).

Next, if the sum of memory occupancy rate and current memory usage is less than the memory threshold, the sum of CPU occupancy rate and current CPU usage is less than the CPU threshold, and the sum of the amount of data of the data set and the current bandwidth usage is less than the amount of data threshold, it is determined not to cache the query request. If one or more of the following three conditions are met, the query request will be determined to be cached: the sum of memory occupancy rate and current memory usage is greater than or equal to the memory threshold, the sum of CPU occupancy rate and current CPU usage is greater than or equal to the CPU threshold, and the sum of amount of data of the data set and current bandwidth usage is greater than or equal to the amount of data threshold.

In one example, the resource threshold (such as memory threshold, CPU threshold, amount of data threshold, etc.) may be a fixed value configured based on experience, that is, the resource threshold will not change. In another example, the resource threshold can also be adjusted dynamically, that is, after the initial value of the resource threshold is configured according to experience, the resource threshold can then be dynamically adjusted. The dynamic adjustment process of the resource threshold will be described below in conjunction with certain specific example embodiments.

For a query request in the external memory, after sending the data set of the query request to the client, the resource threshold can be adjusted dynamically, that is, each query request in the external memory triggers an adjustment of the resource threshold.

For example, after receiving a query request 1, a resource threshold 1 is used to determine whether to cache the query request 1; if caching it, the context information corresponding to the query request 1 is stored in an external memory; after sending the data set corresponding to the query request 1 to the client, the resource threshold 1 is adjusted to become a resource threshold 2. After receiving a query request 2, the resource threshold 2 is used to determine whether to cache the query request 2; if it is not to be cached, the context information corresponding to the query request 2 will not be stored in the external memory. After sending the data set corresponding to the query request 2 to the client, there is no need to adjust the resource threshold 2.

In one example, the process of dynamically adjusting the resource threshold may include: obtaining the processing time corresponding to the query request, in which the processing time can be: the time period from receiving the query request to sending the data set to the client. Next, the resource threshold may be adjusted according to the processing time corresponding to the query request. Further, the process of "adjusting the resource threshold according to the processing time corresponding to the query request" may include, but is not limited to: if the processing time corresponding to the query request is greater than a preset first time threshold, the value of the resource threshold can be increased, where the increased resource threshold is not greater than an upper limit of the resource threshold; if the processing time corresponding to the query request is less than the preset second time threshold, the value of resource threshold can be reduced, where the reduced resource threshold is not less than a lower limit of the resource threshold.

The receiving time of the query request can be obtained from the context information, and the time when the data set is sent to the client would be the current time when the resource threshold is adjusted. In summary, the front-end server may determine the difference between the current time and the receiving time as the processing time corresponding to the query request.

Both the above-mentioned preset first time threshold and preset second time threshold can be configured according to experience. There is no restriction on them, and the preset first time threshold can be greater than the preset second time threshold.

The upper limit of the resource threshold can be configured according to experience, and there is no restriction on the upper limit of the resource threshold. The lower threshold of the resource threshold can be configured according to experience, and there is no restriction on the lower threshold of the resource threshold. Certainly, when configuring the upper limit of the resource threshold and the lower limit of the resource threshold, the upper limit of the resource threshold can be greater than the lower limit of the resource threshold.

Increasing the value of the resource threshold may include: calculating a sum of the current resource threshold and the first resource adjustment value, if the sum of the two is not greater than the upper limit of the resource threshold, the increased resource threshold is the sum of the two; while if the sum of the two is greater than the upper limit of the resource threshold, the increased resource threshold is the upper limit of the resource threshold.

Reducing the value of the resource threshold may include: calculating the difference between the current resource threshold and the second resource adjustment value, if the difference between the two is not less than the lower threshold of the resource threshold, the reduced resource threshold is the difference between the two; while if the difference between the two is less than the lower threshold of the resource threshold, the reduced resource threshold is the lower threshold of the resource threshold.

Both the first resource adjustment value and the second resource adjustment value may be configured based on experience, and the first resource adjustment value and the second resource adjustment value may be the same or different.

In the above example embodiment, if the processing time corresponding to the query request is greater than the preset first time threshold, it means that when the query request is stored in a cache, the processing time of the query request is relatively long. Therefore, the number of query requests that need to be cached should be minimized. Based on this, the value of the resource threshold can be increased, so that the sum of the resource occupation information and the currently occupied resources of the front-end server is less than the resource threshold. As a result, the query request does not need to be cached, so as to avoid the issue that the processing time of the query request is too long.

In the above example embodiment, if the processing time corresponding to the query request is less than the preset second time threshold, it means that when the query request is stored in the cache, the processing time of the query request can be shortened. Therefore, the number of query requests that need to be cached can be increased. Based on this, the value of resource threshold can be reduced. In this way, the sum of the resource occupation information and the currently occupied resources of the front-end server should be greater than or equal to the resource threshold. As a result, the query request can be cached, and the processing resources of the front-end server can be saved.

Figure 4B:
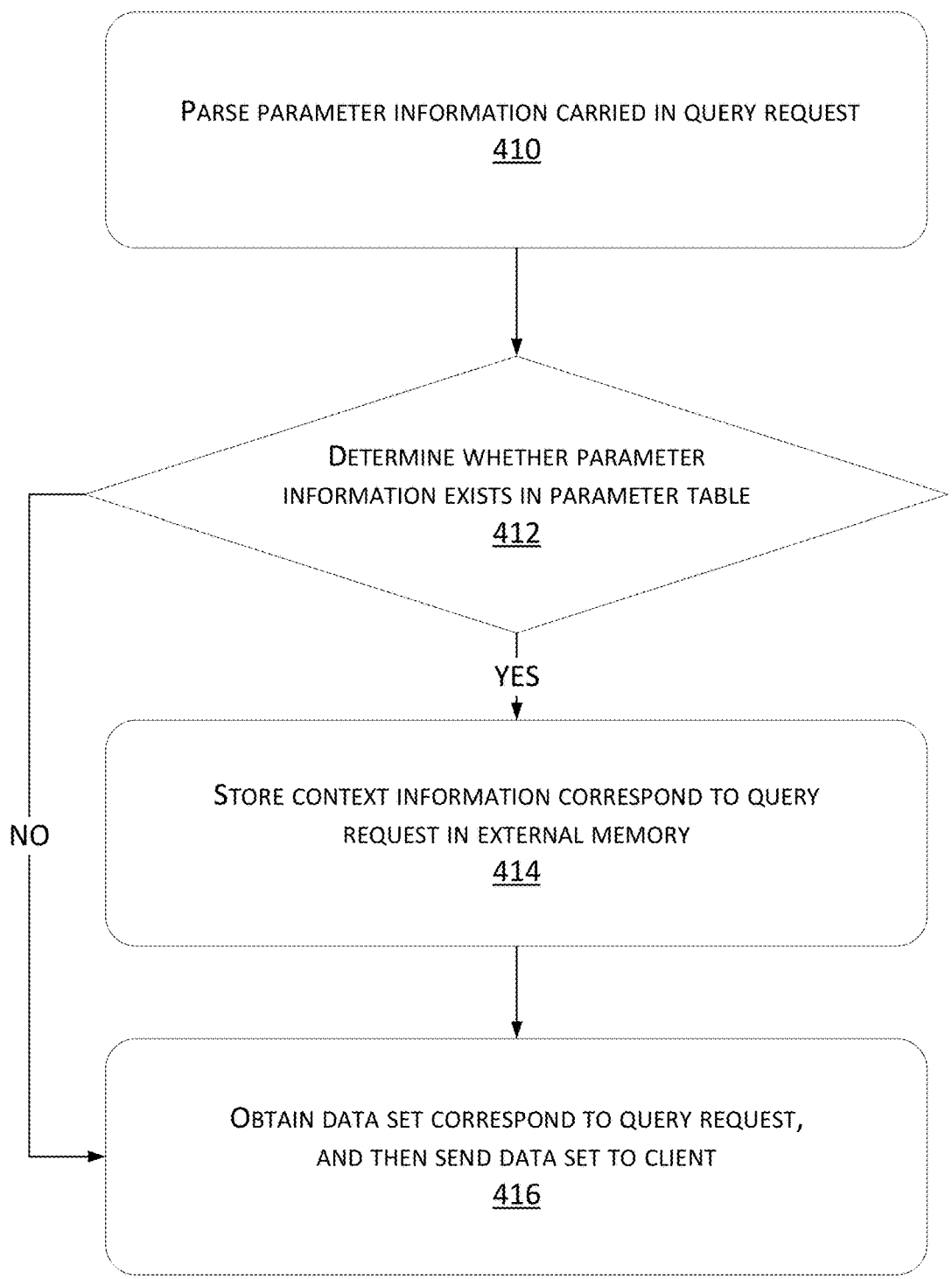
FIG. 4B is a flowchart of a data query method in another example embodiment of the present disclosure.

Case 2: referring to FIG. 4B, another flowchart of the data query method is shown. The method includes:

Step 410 includes parsing parameter information carried in the query request.

Step 412 includes determining whether the parameter information exists in a parameter table; wherein the parameter table is used to record parameter information for caching; if the parameter information exists, going to perform Step 414; if the parameter information does not exist, going to perform Step 416.

Step 414 includes storing the context information corresponding to the query request in the external memory.

Further, steps including reading the context information from the external memory, using the context information to obtain the data set corresponding to the query request, and storing the data set in the external memory are next performed.

Step 416 includes obtaining the data set corresponding to the query request, and sending the data set to the client.

In one example, the front-end server can obtain the parameter information for caching and storing the parameter information in a parameter table. Based on this, after receiving the query request, the parameter information carried in the query request is parsed and then it is determined whether the parameter information exists in the parameter table. If the answer is yes, the query request needs to be cached; while if the answer is no, the query request does not need to be cached.

In an example, the process of "obtaining the parameter information for caching from the front-end server and storing the parameter information in the parameter table" may include, but is not limited to, the following methods:

Manner 1: the front-end server receives a database creation request, where the database creation request carries parameter information for caching, and records the parameter information carried in the database creation request to the parameter table.

If some pieces of parameter information need to be cached, those pieces of parameter information for caching may be specified. Specifically, a database creation request with the parameter information may be sent to the front-end server to notify the front-end server of the parameter information for caching. The front-end server then records the parameter information carried in the database creation request to the parameter table.

For example, the database creation request can be: create database test options (resource_type='ecu' ecu_type='c1' ecu_count=2 with_result_cache='true'), where create database test options indicates that the current message is a database creation request, resource_type='ecu' is the resource model type of the target database; ecu_type='c1' is the resource model of the target database; ecu_count=2 is the quantity information of the resource model of the target database; and with_result_cache='true' is parameter information for caching.

In addition, the above parameter information is effective for all tables in the current database. In other words, for all tables in the current database, if a query request for these tables is received, and the query request carries the above parameter information for caching, it means that the query request needs to be cached.

Manner 2: the front-end server receives a table group creation request, which carries the parameter information for caching, and records the parameter information carried in the table group creation request to the parameter table.

If some pieces of parameter information need to be cached, the parameter information for caching may be specified when creating a database table group. Specifically, a table group creation request carrying the parameter information can be sent to the front-end server to notify the front-end server of the parameter information for caching. The front-end server records the parameter information carried in the table group creation request in the parameter table.

For example, an example of the table group creation request may include: create tablegroup test options (with result cache='true'), where create tablegroup test options indicates that the current message is a table group creation request; and with_result_cache='true' is the parameter information for caching.

In addition, the above parameter information is effective for all tables in the current table group. That is to say, for all of the tables in the current table group, if a query request for these tables is received, and the query request carries the above parameter information for caching, it indicates that the query request needs to be cached.

Manner 3: the front-end server receives a table creation request, and the table creation request carries parameter information for caching; then the parameter information carried in the table creation request is recorded to the parameter table.

If some pieces of parameter information need to be cached, the parameter information for caching can be specified when creating a database table. Specifically, a table creation request carrying parameter information can be sent to the front-end server, so that the front-end server can be notified of the parameter information for caching. The front-end server then records the parameter information carried in the table creation request to the parameter table.

For example, an example of a table creation request could be: CREATE TABLE test (col1 varchar, col2 varchar, PRIMARY KEY (col1)) PARTITION BY HASH KEY (col1) PARTITION NUM 10 SUBPARTITION BY LIST KEY (col2) TABLEGROUP test group OPTIONS (UPDATETYPE='realtime' with result cache='true'), where CREATE TABLE test indicates that the current message is a table creation request; (col1 varchar, col2 varchar, PRIMARY KEY (col1)) PARTITION BY HASH KEY (col1) PARTITION NUM 10 SUBPARTITION BY LIST KEY (col2) TABLEGROUP test_group OPTIONS is related to the table; UPDATETYPE='realtime' is the type information of the table; and with_result_cache='true' is the parameter information for caching.

The above parameter information is only effective for the current table. In other words, if a query request for the current table is received, and the query request carries the parameter information, it indicates that the query request needs to be cached.

In the above example embodiment, all of the tables refer to the data tables in the database, which is not limited in the present disclosure.

Certainly, the above example embodiments only provide a few examples of "whether to cache the query request," and there is no limitation on it in the present disclosure. For example, if a query request needs to be cached, a hint parameter can be carried in the query request. For example, query request is /*+withResultCache=true*/select id, name from test limit 100. Since the query request carries the hint parameter, the front-end server will determine to cache the query request after receiving the query request. In another example, the front-end server may also use the cache through the specific status of a global switch, a database switch, a table group switch, and a table switch. Specifically, if the global switch is on, all query requests will be cached. If the global switch is off and the database switch is on, all query requests to the database will be cached. If the global switch and the database switch are off, and the table group switch is on, all query requests for the table group will be cached. If the global switch, database switch and table group switch are off, and the table switch is on, all query requests for the table will be cached.

Figure 4C:
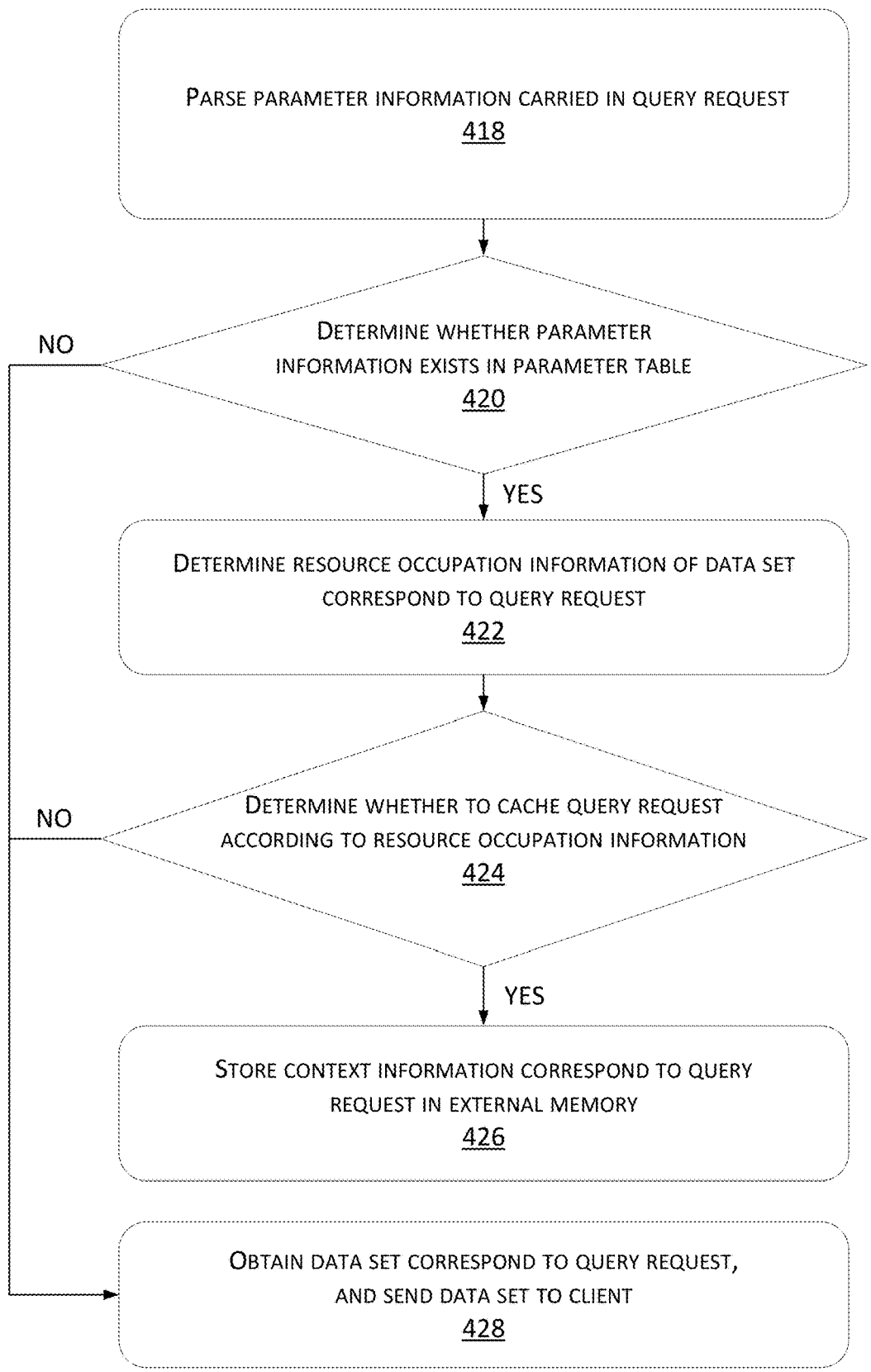
FIG. 4C is a flowchart of a data query method in yet another example embodiment of the present disclosure.

Case 3, as shown in FIG. 4C, another flowchart of the data query method is provided. The method includes:

Step 418 includes parsing the parameter information carried in the query request.

Step 420 includes determining whether the parameter information exists in the parameter table.

If the answer is yes, step 422 is performed; if the answer is no, step 428 is performed.

Step 422 includes determining the resource occupation information of the data set corresponding to the query request.

Step 424 includes determining whether to cache the query request according to the resource occupation information.

If the answer is yes, step 426 is performed; if the answer is no, step 428 is performed.

Step 426 includes storing the context information corresponding to the query request in the external memory.

Step 428 includes obtaining the data set corresponding to the query request and sending the data set to the client.

In case 1, case 2 and case 3 mentioned above, for the process of "obtaining the data set corresponding to the query request and sending the data set to the client," the front-end server can perform SQL parse on the query request, use an SQL parse result to generate a scheduling request, and send the scheduling request to a computing server, where the scheduling request is used to request the data corresponding to the query request; then, the front-end server may receive the data set returned by the computing server and send the data set to the client.

For step 306, in one example, the process of "reading context information from the external memory" may include, but is not limited to: using the context information in the external memory to determine the priority corresponding to the context information; next, using the priority corresponding to the context information to sort the context information in the external memory, and according to a sorting result, reading the context information of the highest priority from the external memory.

The external memory may store multiple pieces of context information. For all of the context information, the front-end server can determine the priority corresponding to each context information, and sort all of the context information in the external memory in an order of priority of from high to low, and then read the context information with the highest priority, that is, the first piece of context information; or, according to the order of priority of from low to high, sort all the context information in the external memory, and then read the context information with the highest priority, that is, the last piece of context information.

In an example, the context information may include, but is not limited to: the receiving time of the query request and the predicted amount of data corresponding to the query request, as shown in Table 1. Based on this, the process of "using the context information in external memory to determine the priority corresponding to the context information" may include, but is not limited to: the front-end server using a difference between the current time and the receiving time to determine the waiting time corresponding to the context information; and then to determine the priority corresponding to the context information according to the waiting time and the predicted amount of data.

Further, the process of "determining the priority corresponding to the context information according to the waiting time and the predicted amount of data" may include, but is not limited to: performing a normalization treatment on the waiting time to get a first sub-weight; performing a normalization treatment on the predicted amount of data to obtain a second sub-weight; and then obtaining a first weight value according to the first sub-weight and the second sub-weight; next, obtaining the priority corresponding to the context information according to the first weight value; in this case, the larger the first weight value, the higher the priority corresponding to context information, and the smaller the first weight value, the lower the priority corresponding to context information.

For example, assuming that the context information in the external memory is shown in Table 3, the front-end server can determine the priority A corresponding to the query ID 101, the priority B corresponding to the query ID 102, and the priority C corresponding to the query ID 103. Specifically, assuming that the current time is 2017.11.6.14.16.18 (that is, 14:16:18 on Nov. 6, 2017), the waiting time corresponding to the query identifier 101 is 8 seconds, the waiting time corresponding to the query identifier 102 is 3 seconds, and the waiting time corresponding to the query identifier 103 is 1 second.

TABLE 3

| Query identifier | Receiving time | User information | Predicted amount of data | Query request |
|---|---|---|---|---|
| 101 | 2017.11.6.14.16.10 | IP address A | 25.6M | query request 1 |
| 102 | 2017.11.6.14.16.15 | IP address B | 10M | query request 2 |
| 103 | 2017.11.6.14.16.17 | IP address C | 2M | query request 3 |

Next, a normalization treatment is carried out for the waiting time, that is, the waiting time can be converted into a value between 0 and 1. In the conversion process, the greater the waiting time, the larger the normalized first sub-weight. For example, the waiting time corresponding to the query identifier is divided by the sum of the waiting times of all query identifiers. Therefore, the first sub-weight corresponding to the query identifier 101 is 8/12, which is 0.667. The first sub-weight corresponding to the query identifier 102 is 3/12, which is 0.25. The first sub-weight corresponding to the query identifier 103 is 1/12, which is 0.083. Certainly, the above method is only an example of the normalization treatment of the waiting time, and there is no restriction on the treatment method.

A normalization treatment may be carried out for the predicted amount of data, that is, the predicted amount of data can be converted into a value between 0 and 1. In the conversion process, the larger the predicted amount of data, the smaller the normalized second sub-weight, and the specific calculation can be, for example, the sum of the predicted amounts of data of all query identifiers minus the predicted amount of data corresponding to this query identifier, and then divide the foregoing result by the sum of the predicted amounts of data of all query identifiers. Therefore, the second sub-weight corresponding to the query identifier 101 is (37.6−25.6)/37.6, which is 0.319. The second sub-weight corresponding to the query identifier 102 is (37.6−10)/37.6, which is 0.734. The second sub-weight corresponding to the query identifier 103 is (37.6−2)/37.6, which is 0.947. Certainly, the above is only an example of the normalization treatment, and there is no restriction on the treatment method.

Next, the product of first sub-weight and second sub-weight is used as the first weight value. For example, the first weight value corresponding to the query identifier 101 is 0.667*0.319, or 0.213; the first weight value corresponding to the query identifier 102 is 0.25*0.734, or 0.183; and the first weight value corresponding to the query identifier 103 is 0.083*0.947, or 0.079.

Next, according to the first weight value, the priority corresponding to the query identifier is obtained. There is no restriction on this issue, as long as the following conditions are met, the larger the first weight value, the higher the priority, and the smaller the first weight value, the lower the priority. For example, the priority corresponding to the first weight value 0.213 is 213 (or 21), the priority corresponding to the first weight value 0.183 is 183 (or 18), and the priority corresponding to the first weight value 0.079 is 79 (or 8).

In summary, the priority corresponding to the query identifier 101 may be higher than the priority corresponding to the query identifier 102, and the priority corresponding to the query identifier 102 may be higher than the priority corresponding to the query identifier 103. In other words, the sorting result of all context information in the external memory is as follows: the context information corresponding to the query identifier 101, the context information corresponding to the query identifier 102, and the context information corresponding to the query identifier 103. Therefore, the front-end server can read the context information corresponding to the query identifier 101 from the external memory.

Next, the front-end server can parse the query request 1 from the context information corresponding to the query identifier 101, and obtain the data set corresponding to the query request 1. Assuming the obtained data set is data set A. Then, the data set A is stored in the external memory. See Table 4 which show an example after storing the data set A.

also the data set corresponding to the query request as mentioned above. For the convenience of description, the data returned by the computing server to the front-end server may be referred to as the data set.

The above query request may be an SQL query request. Thus, the front-end server performs SQL parse on the query request and learns that the query request is used for requesting data sets, such as request data set 1 and data set 2. Next, the front-end server performs analysis to find the computing server corresponding to the data set 1 and then sends a scheduling request to the computing server for requesting the data set 1; after receiving the scheduling request, the computing server sends the data set 1 to the front-end server. In addition, the front-end server performs analysis to find another computing server corresponding to the data set 2 and then sends a scheduling request to the computing server for requesting the data set 2; after receiving the scheduling request, the computing server sends the data set 2 to the front-end server. After receiving the data set 1 and the data set 2, the front-end server can form the data set 1 and the data set 2 into a data set, that is, the data set corresponding to the query request.

In step 306, when the front-end server reads the context information from the external memory, even if there are multiple pieces of context information in the external memory, the front-end server can only read one piece of context information in one reading process. After obtaining the data set corresponding to the query request using the context information and storing the data set in the external memory, another piece of context information can be read from the external memory (during the reading process, the steps of determining the priority, sorting and other operations will be performed again, which will not be repeated herein), and so on.

As shown in FIG. 2B, the front-end server can start a scheduling thread, which first processes the query request 3 in the external memory; after obtaining the data set corresponding to the query request 3 and storing the data set in the external memory, the scheduling thread processes a query request 4 in the external memory, and so on.

For step 308, in an example, the process of "reading data set from the external memory" may include, but is not limited to, the following steps: determining the priority of the data set corresponding to the context information using the context information in the external memory; and then

TABLE 4

| Query identifier | Receiving time | User information | Predicted amount of data | Query request | Data set |
|---|---|---|---|---|---|
| 101 | 2017.11.6.14.16.10 | IP address A | 25.6M | query request 1 | data set A |
| 102 | 2017.11.6.14.16.15 | IP address B | 10M | query request 2 | |
| 103 | 2017.11.6.14.16.17 | IP address C | 2M | query request 3 | |

For step 306, in an example, the process of "using context information to obtain a data set corresponding to a query request" may include, but is not limited to the following steps: the front-end server parses the query request from the context information, generates a scheduling request corresponding to the query request, and then sends the scheduling request to a computing server, next the front-end server receives the data set returned by the computing server corresponding to the scheduling request, and the data set is sorting the data sets in the external memory using the priorities of the data sets, next reading the data set from the external memory according to the sorting result of the data sets.

Multiple data sets may be stored in the external memory, and each data set has the corresponding context information. For all of the data sets, the front-end server may use the context information corresponding to each data set to determine the priorities of the data sets and sort all of the data sets in the external memory in an order of priority of from high to low; alternatively, it may sort all of the data sets in the external memory in an order of priority of from low to high.

In one example, after obtaining the data set corresponding to the query request, the front-end server may also count the amount of data of the data set (that is, the actual amount of data, which may be different from the predicted amount of data), and then store the amount of data of the data set in the context information thereof. As shown in Table 5, it is an example of the context information.

TABLE 5

| Query identifier | Receiving time | User information | Predicted amount of data | Query request | Amount of data | Data set |
|---|---|---|---|---|---|---|
| 101 | 2017.11.6.14.16.10 | IP address A | 25.6M | query request 1 | 26M | data set A |
| 102 | 2017.11.6.14.16.15 | IP address B | 10M | query request 2 | 12M | data set B |
| 103 | 2017.11.6.14.16.17 | IP address C | 2M | query request 3 | 3M | data set C |

In summary, the context information may include, but is not limited to: the receiving time of the query request and the amount of data of the data set corresponding to the query request. Based on the foregoing, the process of "determining the priority of the data set corresponding to the context information using the context information in the external memory" may include, but is not limited to: the front-end server using a difference between the current time and the receiving time to determine the waiting time corresponding to the context information; and then, according to the waiting time and the amount of data of the data set, the priority of the data set corresponding to the context information is determined.

Further, the process of "determining the priority of the data set corresponding to the context information according to the waiting time and the amount of data of the data set" may include, but is not limited to, the following steps: performing a normalization treatment on the waiting time to obtain a third sub-weight; performing a normalization treatment on the amount of data to obtain a fourth sub-weight; obtaining a second weight value according to the third sub-weight and the fourth sub-weight; obtaining the priority of the data set according to the second weight value; wherein the larger the second weight value, the higher the priority, and the smaller the second weight value, the lower the priority.

With the normalization treatment on the waiting time, the waiting time can be converted to a value between 0 and 1. In the conversion process, the greater the waiting time, the larger the normalized third sub-weight. After the amount of data is normalized, the amount of data can be converted to a value between 0 and 1. In the conversion process, the larger the amount of data, the smaller the normalized fourth sub-weight. When the second weight value is obtained based on the third sub-weight and the fourth sub-weight, the product of the third sub-weight and the fourth sub-weight is used as the second weight value.

The process of "determining the priority of the data set according to the waiting time and the amount of data of the data set" is similar to the process of "determining the priority corresponding to the context information according to the waiting time and the predicted amount of data," the difference therebetween is that the amount of data of the data set used herein is different from the predicted amount of data, and this process will not be repeated herein.

In summary, assuming that the priority of data set A is higher than the priority of data set B and the priority of data set B is higher than the priority of data set C, the sorting result would be: data set A, data set B, data set C.

In an example, the process of "reading the data set from the external memory according to the sorting result of the data set" may include, but is not limited to, the following: if the priorities are sorted in an order of from high to low, the front-end server may read the top N data sets from the external memory according to the sorting result of the data sets, or, if the priorities are sorted from low to high, the front-end server may read the bottom N data sets from the external memory according to the sorting result of the data sets.

The N is a positive integer greater than or equal to 1. In addition, the sum of the resource occupation information corresponding to the N data sets and the currently occupied resources of the front-end server is smaller than the current resource threshold.

In the case where the resource occupation information includes a memory occupancy rate, a CPU occupancy rate, and an amount of data of the data set, the resource threshold may include a memory threshold, a CPU threshold, and an amount of data threshold. Moreover, the front-end server can also count the current memory usage, the current CPU usage, and the current bandwidth usage.

On this basis, the front-end server determines the memory occupancy rate (see step 402), the CPU occupancy rate (see step 402), and the amount of data of the data set (obtained from Table 5) corresponding to the data set with the highest priority.

If the sum of the memory occupancy rate and the current memory usage is less than the memory threshold, meanwhile the sum of the CPU usage and the current CPU usage is less than the CPU threshold, and the sum of the amount of data of the data set and the current bandwidth usage is less than the amount of data threshold, the data set with the highest priority would be read from the external memory. If any one or more of the above three conditions are not met, the data set would not be read from the external memory. After waiting for a preset time period, it will be determined again whether the data set with the highest priority can be read from external memory.

After reading the data set with the highest priority from the external memory, the front-end server determines the memory occupancy rate, the CPU usage, and the amount of data of the data set corresponding to the data set with the second highest priority. If the sum of the memory occupancy rate corresponding to the data set with the highest priority, the memory occupancy rate corresponding to the data set with the second highest priority, and the current memory usage are less than the memory threshold, meanwhile the sum of the CPU usage corresponding to the data set with the highest priority, the CPU usage corresponding to the data set with the second highest priority, and the current CPU usage is less than the CPU threshold, and the sum of the amount of data corresponding to the data set with the highest priority, the amount of data corresponding to the data set with the second highest priority, and the current bandwidth usage is less than the amount of data threshold, the data set with the second highest priority will be read from the external memory, and so on. If any one or more of the above three conditions cannot be met, the data set with the second highest priority will not be read from the external memory, and the reading process ends.

In summary, the front-end server can read N data sets from the external memory, and the sum of the resource occupation information corresponding to the N data sets and the currently occupied resources of the front-end server is less than the resource threshold.

In an example, after the front-end server reads N data sets from the external memory, it sends the read N data sets to the client. For example, the user information in the context information is used to send the data set to the corresponding client, and the sending process will not be repeated herein. Next, the front-end server may also delete the context information corresponding to the data set from the external memory, thus completing the entire process of sending the data set.

In step 308, when the front-end server reads the data set from the external memory, even if there are multiple data sets in the external memory, the front-end server can only read N data sets in a single reading process. After the N data sets are sent to the client, the front-end server reads different data sets from the external memory again, and so on.

Based on the above technical solutions, in the example embodiments of the present disclosure, after receiving a query request, instead of directly sending the data set to the client, the query request and data set are actually first stored in the external memory. In this way, the data set corresponding to the query request can be cached locally, thereby avoiding the issue of processing multiple query requests within a short period of time, and avoiding returning multiple data sets to the client within a short period of time, thereby reducing the occupation of CPU resources, memory resources and network bandwidth, avoiding the problem of client query timeout or failure, and improving the user experience. Moreover, the above method can cache the query request with a large amount of data in a local storage, while the query request with a small amount of data is not cached in the local storage. In this way, the data set with a small amount of data can be directly sent to the client without affecting the query request with a small amount of data, and the frequency of full gc is thus reduced as much as possible.

Figure 5A:
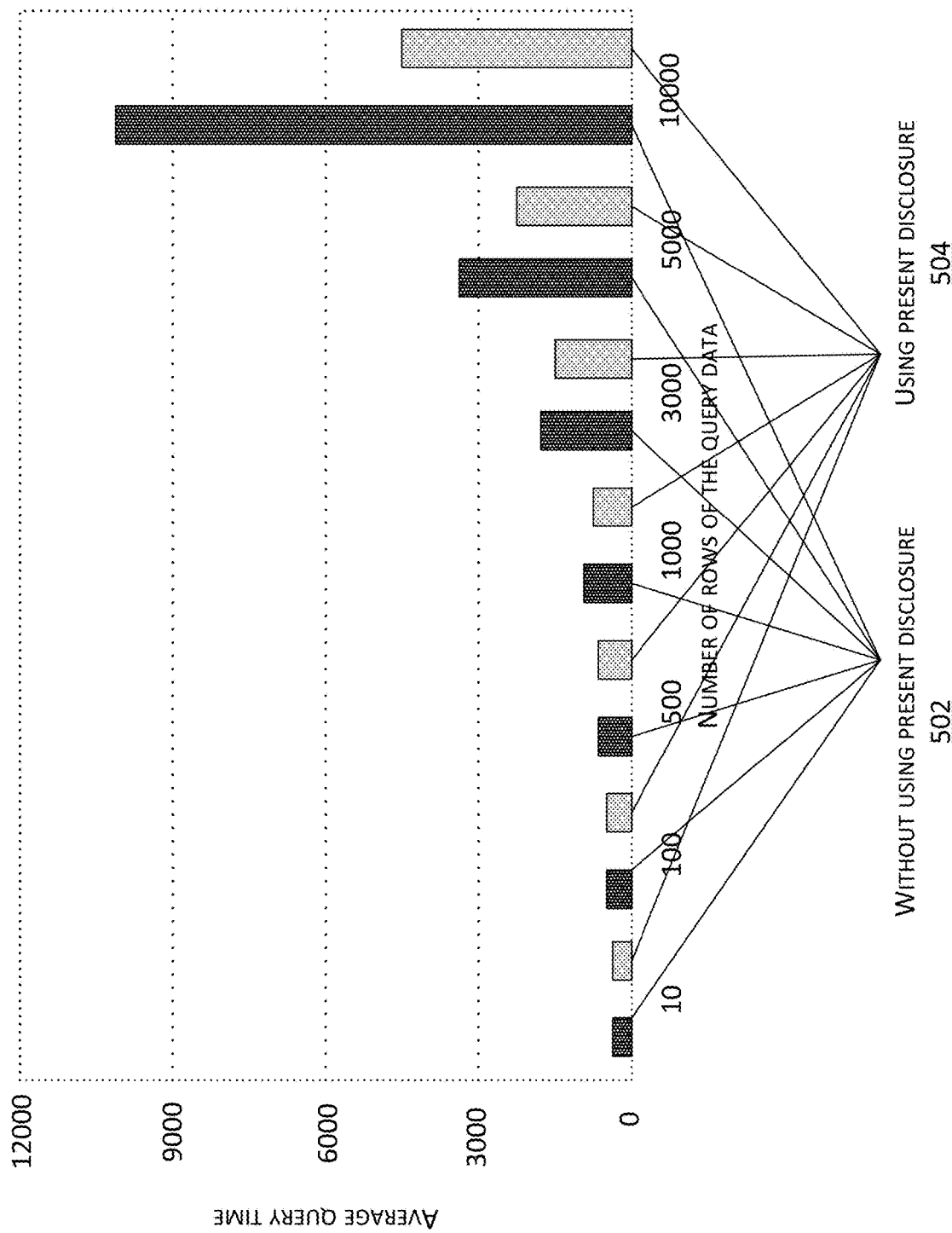
FIG. 5A is a schematic diagram of the effect in an example embodiment of the present disclosure.

FIG. 5A is a schematic diagram of a test result. A table with a large amount of data is queried, in which /*+withResultCache=true*/select id, name, . . . , region from test where id=xxx limit xxx, limit 10, limit 100, limit 500, limit 1000, limit 2000, limit 5000, limit 8000, limit 10000 are respectively used to limit the number of rows of the data set. In this case, the greater the number of rows in the data set, the larger the amount of data of the data set. In FIG. 5A, the relationship between the amount of data of the data set and the average query time is provided. In order to simulate the memory usage, other programs are executed before the test to keep the memory usage at around 75%, and the above query operations are then executed asynchronously. As can be seen in FIG. 5A, with the implementation of the technical solution of the present disclosure, when the data set is large, the query time can be significantly reduced, and the frequency of full gc can also be reduced. 502 indicates the results without using present disclosure. 504 indicates the results using the present disclosure.

Figure 5B:
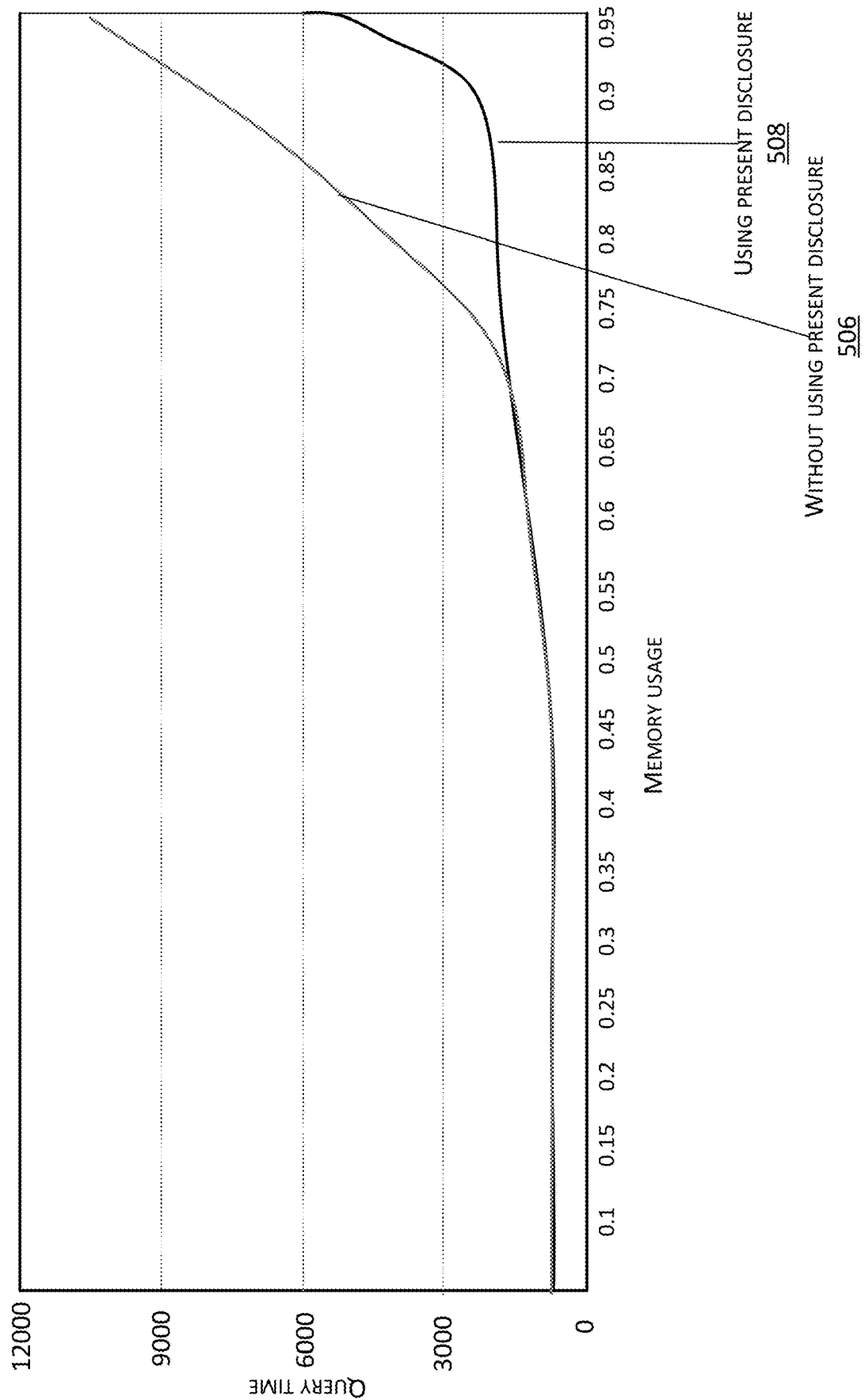
FIG. 5B is a schematic diagram of the effect in another example embodiment of the present disclosure.

FIG. 5B is a schematic diagram of the relationship between memory usage and query time. In this case, an SQL query request is tested by running other programs to control memory usage. It is shown in the test that when the memory usage exceeds a certain level, if the method of the present disclosure is used, the query time can be significantly reduced. 506 indicates the results without using present disclosure. 508 indicates the results using the present disclosure.

Figure 5C:
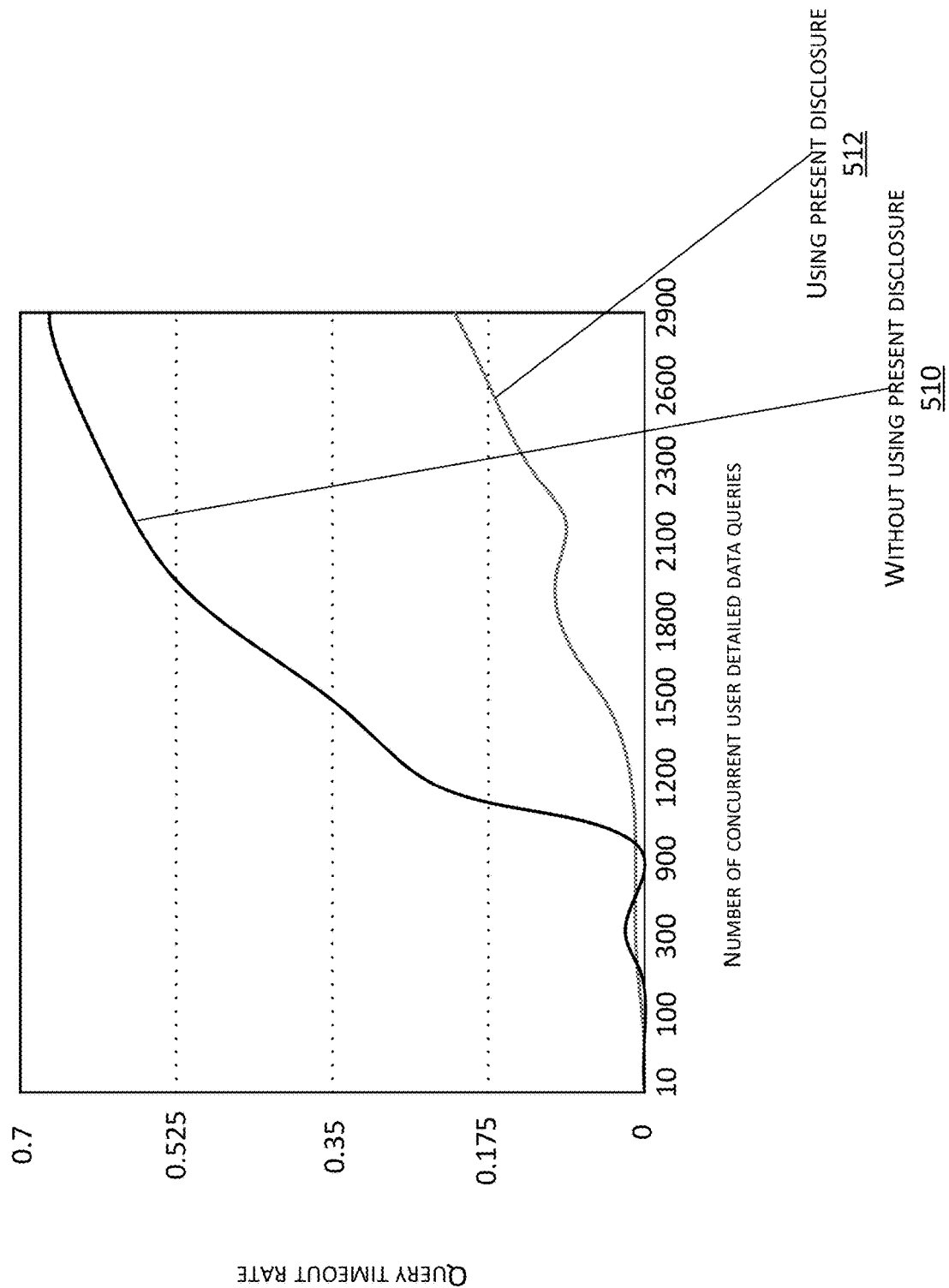
FIG. 5C is a schematic diagram of the effect in another example embodiment of the present disclosure.

As shown in FIG. 5C, it is a schematic diagram of querying the user detailed data. For example, /*+withResultCache=true*/select id, name, . . . , region from test where id=xxx limit 5000, 100 columns of data in total are queried, where the counting is performed according to different concurrencies and query timeout rates. As can be seen from FIG. 5C, the greater the number of concurrent queries, the higher the timeout rate. Moreover, when a certain number of concurrencies are exceeded, the query timeout rate increases significantly. Obviously, after using the method of the present disclosure, the increase of query timeout rate can be slowed down. 510 indicates the results without using present disclosure. 512 indicates the results using the present disclosure.

Figure 5D:
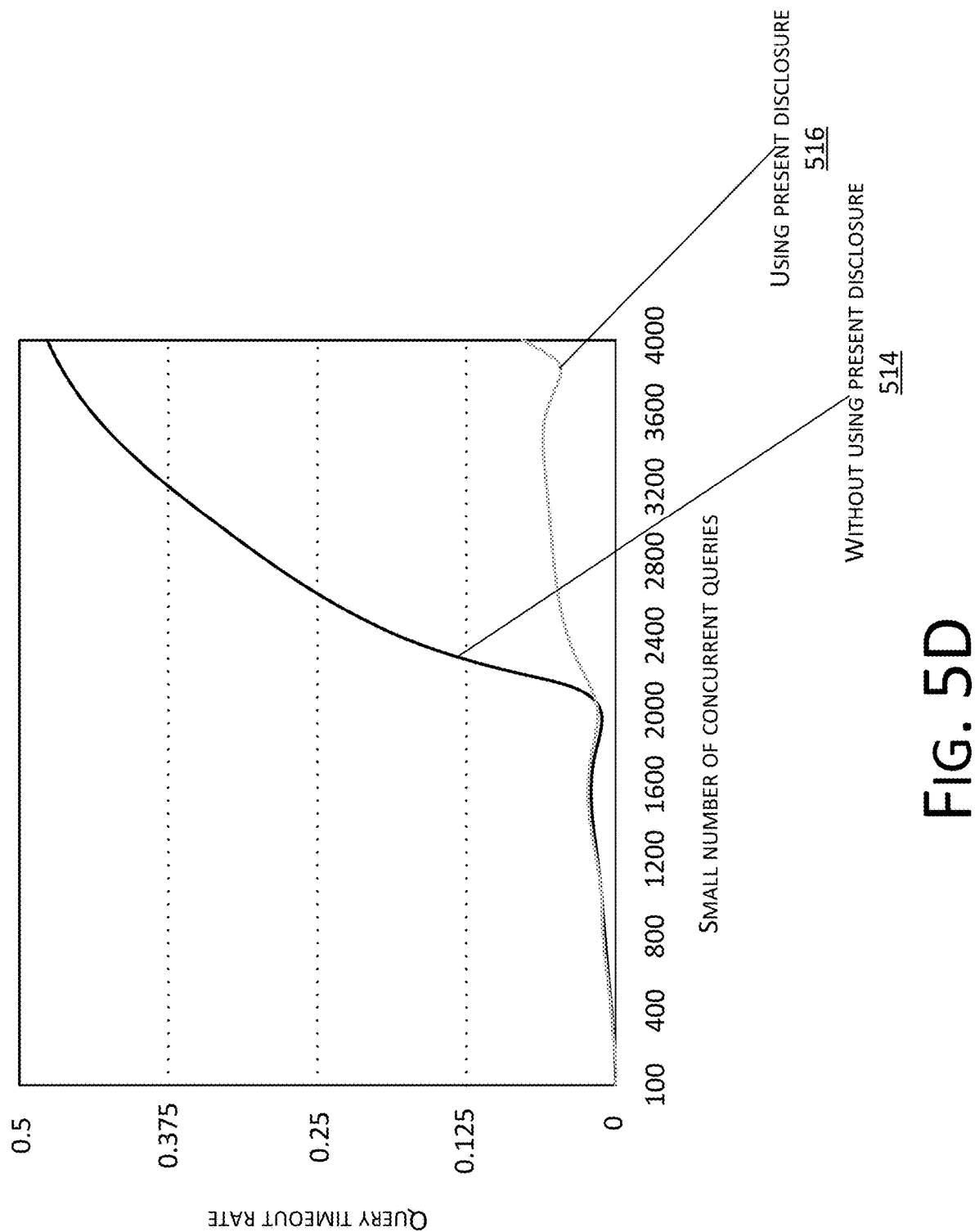
FIG. 5D is a schematic diagram of the effect in another example embodiment of the present disclosure.

As shown in FIG. 5D, it is a schematic diagram of the concurrent test of querying a relatively small data set alone, for example, /*+withResultCache=true*/select id, name from test where id=xxx limit 50. The relationship between query concurrency and query timeout rate is shown in 5D. Similar to FIG. 5C, when the certain number for concurrency is exceeded, the query timeout rate begins to increase continuously. Obviously, after using the method of the present disclosure, the critical value of the number of concurrencies that the query timeout rate suddenly increases can be pushed higher. Thus, in the same scenario, the number of concurrencies for users can be increased. 514 indicates the results without using present disclosure. 516 indicates the results using the present disclosure.

Figure 5E:
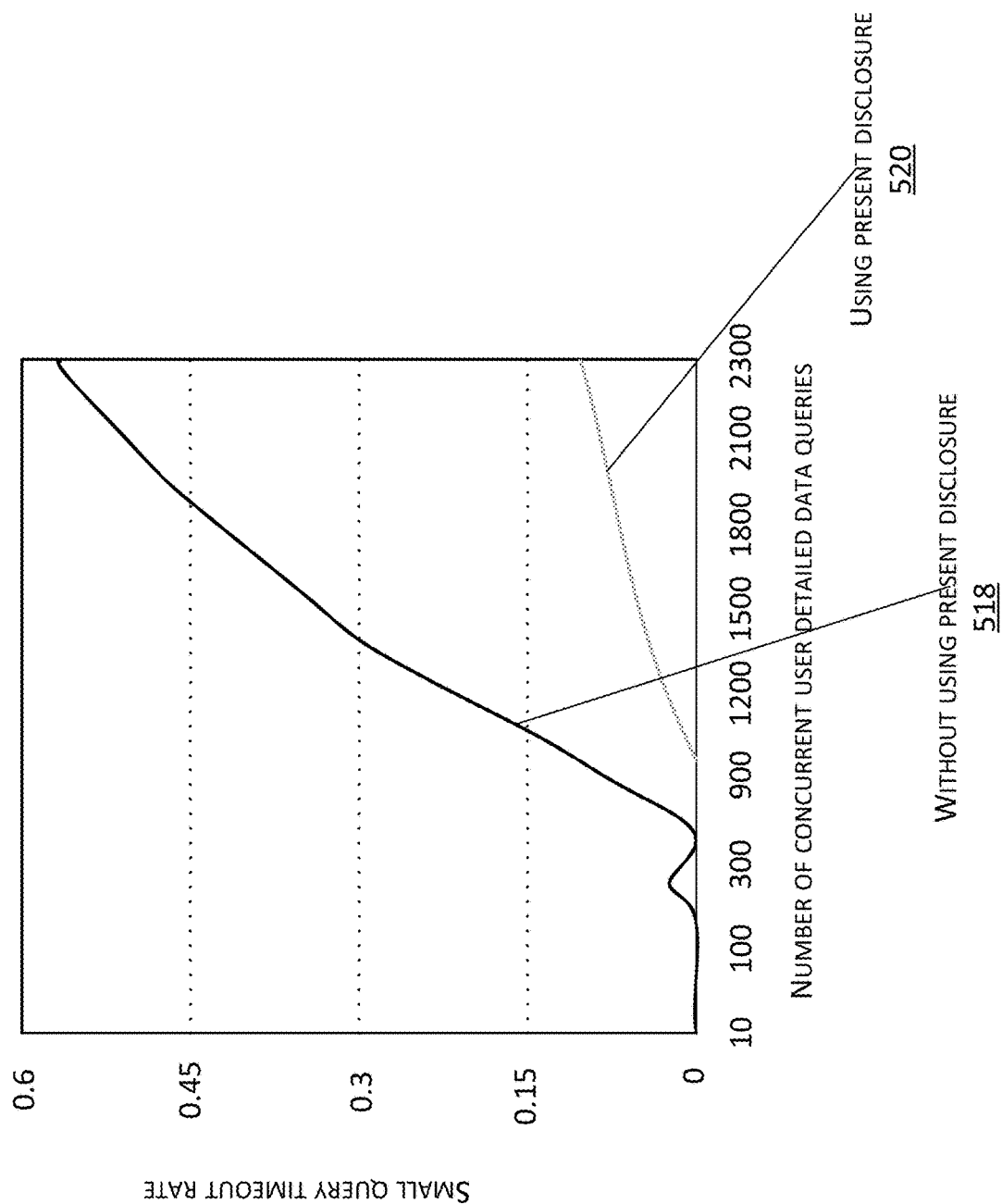
FIG. 5E is a schematic diagram of the effect in yet another example embodiment of the present disclosure.

FIG. 5E is a schematic diagram for a mixed scenario (that is, there are query operations with large data sets and query operations with small data sets), which shows the impact of the query operations with large data sets on the query timeout rate of the query operations with small data sets. As can be seen in FIG. 5E, when the concurrent number of the query operations with large data sets exceeds a certain critical value, the query timeout rate of the query operations with small data sets begins to increase continuously. Obviously, after using the method of the present disclosure, the query timeout rate of the query operations with small data sets can be improved. 518 indicates the results without using present disclosure. 520 indicates the results using the present disclosure.

Figure 6:
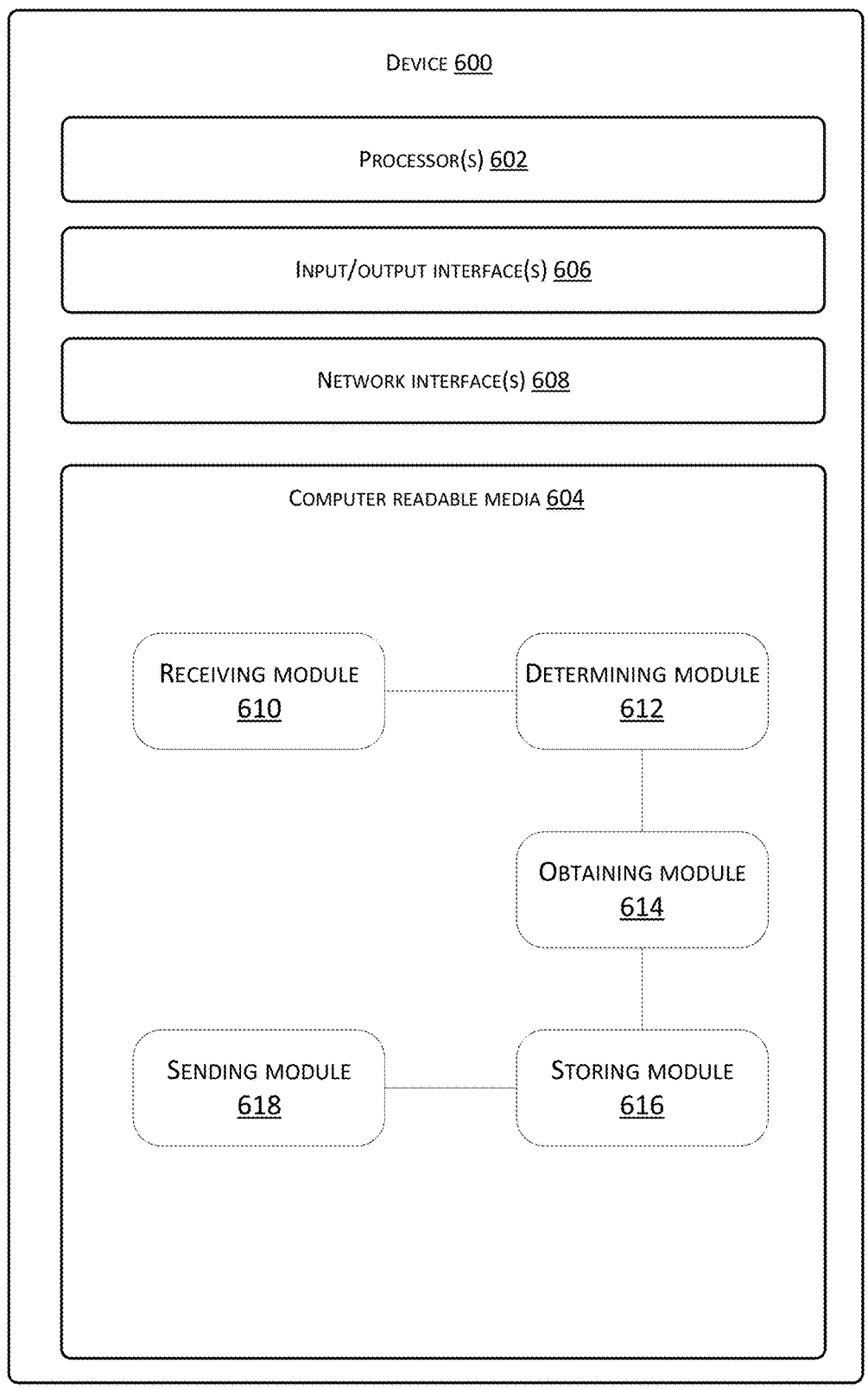
FIG. 6 is a structural diagram of a data query device in an example embodiment of the present disclosure.

Based on the above method, the example embodiments of the present disclosure further provide a data query device that is applied to a front-end server. As shown in FIG. 6, it is a structural diagram of a device 600.

As shown in FIG. 6, the device 600 includes one or more processor(s) 602 or data processing unit(s) and computer readable media 604. The device 600 may further include one or more input/output interface(s) 606 and one or more network interface(s) 608.

The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media (transitory media) such as a modulated data signal and carrier.

The computer readable media 604 may store therein a plurality of modules or units including:

a receiving module 610, which is used for receiving a query request sent by a client;

a determining module 612, which is used for determining resource occupation information of a data set corresponding to the query request;

an obtaining module 614, which is used for, in response to determining to cache the query request according to the resource occupation information, obtaining the data set corresponding to the query request;

a storing module 616, which is used for storing the data set in an external memory;

a sending module 618, which is used for reading the data set from the external memory and sending the data set to the client.

The obtaining module 614 is specifically used for, in the process of obtaining the data set corresponding to the query request, storing the context information corresponding to the query request in the external memory, reading the context information from the external memory, and obtaining the data set corresponding to the query request using the context information.

The obtaining module 614 is also specifically used for, in the process of reading the context information from the external memory, determining the priority corresponding to the context information using the context information in the external memory, sorting the context information in the external memory using the priority corresponding to the context information, and reading the context information of the highest priority from the external memory according to a sorting result.

In addition, the process of obtaining the data set corresponding to the query request using the context information includes: generating a scheduling request corresponding to the query request, sending the scheduling request to a computing server, and receiving the data set corresponding to the scheduling request returned by the computing server.

The sending module 618 is specifically used for, in the process of reading the data set from the external memory, determining the priority of the data set corresponding to the context information using the context information in the external memory, sorting the data sets in the external memory using the priority of the data set, and reading the data set from the external memory according to a sorting result of the data sets.

Based on the above method, the example embodiments of the present disclosure also provide a front-end server, where the front-end server may include: a receiver, a processor and a transmitter. The receiver is used for receiving a query request sent by a client. The processor is used for determining resource occupation information of a data set corresponding to the query request; in response to determining to cache the query request according to the resource occupation information, the processor is used for obtaining the data set corresponding to the query request, storing the data set in an external memory, and reading the data set from the external memory. The transmitter is used for sending the data set to the client.

Based on the above method, the example embodiments of the present disclosure also provide a machine-readable storage medium, which can be applied to a front-end server. The machine-readable storage medium stores a number of computer instructions; when computer instructions are executed, the following processing is performed: receiving a query request sent by a client; determining resource occupation information of a data set corresponding to the query request; in response to determining to cache the query request according to the resource occupation information, obtaining the data set corresponding to the query request and storing the data set in an external memory; and reading the data set from the external memory and sending the data set to the client.

For the system, device, module or unit described in the above example embodiments, they may be specifically implemented by a computer chip or entity, or by a product with a certain function. A typical implementation device is a computer, and the specific form of the computer may be a personal computer, a laptop computer, a cellular phone, a camera phone, a smart phone, a personal digital assistant, a media player, a navigation device, an email sending and receiving device, a game console, a tablet computer, a wearable device, or any combination of the foregoing devices.

For the convenience of description, when the above devices are described, they are divided into various units based on the functions thereof and described separately. Certainly, when implementing the present disclosure, the function of each unit can be implemented in one or more pieces of software and/or hardware.

A person skilled in the art would understand that the example embodiments of the present disclosure may be provided as methods, systems, or computer program products. Therefore, the present disclosure may take the form of an entirely hardware example embodiment, an entirely software example embodiment, or an example embodiment combining software and hardware. Moreover, the example embodiments of the present disclosure may take the form of computer program products implemented on one or more computer usable storage media (including, but not limited to, disk storages, CD-ROMs, optical storages, and the like) containing computer usable program code.

The present disclosure is described with reference to flowcharts and/or block diagrams of methods, devices (systems), and computer program products according to the example embodiments of the application. It should be understood that each step and/or block in the flowcharts and/or block diagrams and a combination of the steps and/or blocks in the flowcharts and/or block diagram may be implemented by computer-readable instructions. These computer-readable instructions can be provided to the processor of a general-purpose computer, a special-purpose computer, an embedded processor, or other programmable data processing device to produce a machine that enables the generation of devices for implementing the functions specified in one step or multiple steps in the flowcharts and/or one block or multiple blocks in the block diagrams by using the instructions that are executed by the processor of a computer or other programmable data processing device.

Moreover, these computer-readable instructions can also be stored in a computer-readable memory that can instruct a computer or other programmable data processing device to work in a specific manner, causing the instructions stored in the computer-readable memory to produce products including instruction devices, and the instruction devices can implement the functions specified in one step or multiple steps in the flowcharts and/or one block or multiple blocks in the block diagrams.

These computer-readable instructions may also be loaded onto a computer or other programmable data processing device, causing a series of operating steps to be performed on the computer or the programmable data processing device to produce computer-implemented processing; such that the instructions executed on the computer or the programmable data processing device provide the steps for implementing the functions specified in one step or multiple steps in the flowcharts and/or one block or multiple blocks in the block diagrams.

The above includes only some examples of the present disclosure, and is not intended to limit the present disclosure. For a person of ordinary skill in the art, the present disclosure may have various modifications and changes. Any modification, equivalent replacement, improvement, etc. made within the spirit and principle of the present disclosure should be included in the scope of the claims of the present disclosure.

The present disclosure may further be understood with clauses as follows.

Clause 1. A data query method, applied to a front-end server, the method comprising:

receiving a query request sent by a client;

determining resource occupation information of a data set corresponding to the query request;

in response to determining to cache the query request according to the resource occupation information, obtaining the data set corresponding to the query request, and storing the data set in an external memory; and reading the data set from the external memory and sending the data set to the client.

Clause 2. The method according to clause 1, wherein after determining the resource occupation information of the data set corresponding to the query request, the method further comprises:

in response to determining not to cache the query request according to the resource occupation information, obtaining the data set corresponding to the query request, and sending the data set to the client.

Clause 3. The method according to clause 1, wherein the determining the resource occupation information of the data set corresponding to the query request comprises:

querying a mapping table through a data identifier carried in the query request to obtain the resource occupation information of the data set corresponding to the data identifier, the mapping table recording a corresponding relationship between the data identifier and the resource occupation information, wherein:

after obtaining the data set corresponding to the query request, the front-end server records the corresponding relationship between the data identifier carried by the query request and the resource occupation information of the data set in the mapping table.

Clause 4. The method according to clause 1 or 2, wherein after determining the resource occupation information of the data set corresponding to the query request, the method further comprises:

if a sum of the resource occupation information and currently occupied resources of the front-end server is greater than or equal to a resource threshold, determining to cache the query request; or if the sum of the resource occupation information and currently occupied resources of the front-end server is smaller than the resource threshold, determining not to cache the query request.

Clause 5. The method according to clause 4, wherein after sending the data set to the client, the method further comprises:

obtaining a processing time corresponding to the query request, the processing time being a time period from when the query request is received to when the data set is sent to the client; and adjusting the resource threshold according to the processing time corresponding to the query request.

Clause 6. The method according to clause 5, wherein the adjusting the resource threshold according to the processing time corresponding to the query request comprises:

if the processing time corresponding to the query request is greater than a preset first time threshold, increasing a value of the resource threshold, wherein the increased resource threshold is not greater than an upper limit of the resource threshold; or if the processing time corresponding to the query request is smaller than a preset second time threshold, reducing the value of the resource threshold, wherein the reduced resource threshold is not smaller than a lower limit of the resource threshold.

Clause 7. The method according to clause 1 or 2, wherein the resource occupation information comprises one or any combination of the following:

a memory occupancy rate;

a CPU occupancy rate; and an amount of data of the data set.

Clause 8. The method according to clause 1, wherein the obtaining the data set corresponding to the query request and storing the data set in the external memory comprises:

storing context information corresponding to the query request in the external memory; and reading the context information from the external memory, using the context information to obtain the data set corresponding to the query request, and storing the data set in the external memory.

Clause 9. The method according to clause 8, wherein the storing the context information corresponding to the query request in the external memory comprises:

parsing parameter information carried in the query request and determining whether the parameter information exists in a parameter table, the parameter table recording parameter information for caching; and if the parameter information exists, storing the context information corresponding to the query request in the external memory.

Clause 10. The method according to clause 9, wherein the method further comprises:

receiving a database creation request, the database creation request carrying the parameter information for caching, and recording the parameter information carried in the database creation request to the parameter table;

receiving a table group creation request, the table group creation request carrying the parameter information for caching, and recording the parameter information carried in the table group creation request to the parameter table; and/or receiving a table creation request, the table creation request carrying the parameter information for caching, and recording the parameter information carried in the table creation request to the parameter table.

Clause 11. The method according to clause 8, wherein the reading the context information from the external memory comprises:

determining a priority corresponding to the context information using the context information in the external memory;

sorting the context information in the external memory by using the priority corresponding to the context information; and reading context information with a highest priority from the external memory according to a sorting result.

Clause 12. The method according to clause 11, wherein:

the context information comprises a receiving time of the query request and a predicted amount of data corresponding to the query request; and the determining the priority corresponding to the context information using the context information in the external memory comprises:

determining a waiting time corresponding to the context information using a difference between a current time and a receiving time; and determining the priority corresponding to context information according to the waiting time and the predicted amount of data.

Clause 13. The method according to clause 12, wherein the determining the priority corresponding to context information according to the waiting time and the predicted amount of data comprises:

performing a normalization treatment on the waiting time to obtain a first sub-weight;

performing a normalization treatment on the predicted amount of data to obtain a second sub-weight;

obtaining a first weight value according to the first sub-weight and the second sub-weight; and obtaining the priority corresponding to the context information according to the first weight value, wherein the larger the first weight value is, the higher the priority is, and the smaller the first weight value is, the lower the priority is.

Clause 14. The method according to clause 8, wherein:

the context information comprises the query request; and the obtaining the data set corresponding to the query request using the context information comprises:

generating a scheduling request corresponding to the query request, and sending the scheduling request to a computing server; and receiving the data set corresponding to the scheduling request returned by the computing server.

Clause 15. The method according to clause 1, wherein the reading the data set from the external memory comprises:

determining priorities of data sets corresponding to context information using the context information in the external memory;

sorting data sets in the external memory using the priorities of the data sets; and reading the data set from the external memory according to a sorting result of the data sets.

Clause 16. The method according to clause 15, wherein:

the context information comprises a receiving time of the query request and an amount of data of the data set corresponding to the query request; and the determining the priorities of the data sets corresponding to the context information using the context information in the external memory comprises:

determining a waiting time corresponding to the context information using a difference between a current time and the receiving time; and determining a priority of the data set corresponding to the context information according to the waiting time and the amount of data.

Clause 17. The method according to clause 16, wherein the determining the priority of the data set corresponding to the context information according to the waiting time and the amount of data comprises:

performing a normalization treatment on the waiting time to obtain a third sub-weight;

performing a normalization treatment on the amount of data to obtain a fourth sub-weight;

obtaining a second weight value according to the third sub-weight and the fourth sub-weight; and obtaining the priority of the data set according to the second weight value, wherein the larger the second weight value is, the higher the priority, and the smaller the second weight value is, the lower the priority is.

Clause 18. The method according to clause 16, wherein the reading the data set from the external memory according to the sorting result of the data sets comprises:

if the sorting is performed in an order of priority of from high to low, reading top N data sets from the external memory according to the sorting result of the data sets; or if the sorting is performed in an order of priority of from low to high, reading bottom N data sets from the external memory according to the sorting result of the data sets, wherein:

N is a positive integer greater than or equal to 1; and a sum of the resource occupation information corresponding to the N data sets and currently occupied resources of the front-end server is less than a resource threshold.

Clause 19. A data query device, applied to a front-end server, the device comprising:

a receiving module that receives a query request sent by a client;

a determining module that determines resource occupation information of a data set corresponding to the query request;

an obtaining module that, in response to determining to cache the query request according to the resource occupation information, obtains the data set corresponding to the query request;

a storing module that stores the data set in an external memory; and a sending module that reads the data set from the external memory and sends the data set to the client.

Clause 20. The device according to clause 19, wherein:

the obtaining module, in a process of obtaining the data set corresponding to the query request, stores the context information corresponding to the query request in the external memory; reads the context information from the external memory, and obtains the data set corresponding to the query request using the context information.

Clause 21. The device according to clause 20, wherein the obtaining module:

in a process of reading the context information from the external memory, determines a priority corresponding to the context information using the context information in the external memory; sorts the context information in the external memory using the priority corresponding to the context information; and reads the context information of the highest priority from the external memory according to a sorting result; and in a process of obtaining the data set corresponding to the query request using the context information, generates a scheduling request corresponding to the query request, sends the scheduling request to a computing server; and receives the data set corresponding to the scheduling request returned by the computing server.

Clause 22. The device according to clause 19, wherein the sending module, in a process of reading the data set from the external memory, determines the priority of the data set corresponding to the context information using the context information in the external memory; sorts the data sets in the external memory using the priority of the data set; and reads the data set from the external memory according to a sorting result of the data sets.

Clause 23. A front-end server comprising:
a receiver that receives a query request sent by a client;
a processor that determines resource occupation information of a data set corresponding to the query request; in response to determining to cache the query request according to the resource occupation information, obtains the data set corresponding to the query request, storing the data set in an external memory, and reads the data set from the external memory; and
a transmitter that sends the data set to the client.

What is claimed is:

1. A method comprising:
receiving a query request sent by a client;
determining resource occupation information of a data set corresponding to the query request, the determining the resource occupation information of the data set corresponding to the query request including:
  querying a mapping table through a data identifier carried in the query request to obtain the resource occupation information of the data set corresponding to the data identifier, the mapping table recording a corresponding relationship between the data identifier and the resource occupation information;
in response to determining to cache the query request according to the resource occupation information, obtaining the data set corresponding to the query request and storing the data set in an external memory; and
reading the data set from the external memory.

2. The method according to claim 1, further comprising:
after obtaining the data set corresponding to the query request, recording the corresponding relationship between the data identifier carried by the query request and the resource occupation information of the data set in the mapping table.

3. The method according to claim 1, wherein after the determining the resource occupation information of the data set corresponding to the query request, the method further comprises:
determining that a sum of the resource occupation information and currently occupied resources of a front-end server is greater than or equal to a resource threshold, determining to cache the query request.

4. The method according to claim 1, further comprising:
sending the data set to the client;
obtaining a processing time corresponding to the query request, the processing time being a time period from when the query request is received to when the data set is sent to the client; and
adjusting a resource threshold according to the processing time corresponding to the query request.

5. The method according to claim 4, wherein the adjusting the resource threshold according to the processing time corresponding to the query request comprises:
determining that the processing time corresponding to the query request is greater than a preset first time threshold; and
increasing a value of the resource threshold, wherein the increased resource threshold is not greater than an upper limit of the resource threshold.

6. The method according to claim 4, wherein the adjusting the resource threshold according to the processing time corresponding to the query request comprises:
determining that the processing time corresponding to the query request is smaller than a preset second time threshold, reducing the value of the resource threshold, wherein the reduced resource threshold is not smaller than a lower limit of the resource threshold.

7. The method according to claim 1, wherein the resource occupation information comprises one or any combination of the following:
a memory occupancy rate;
a CPU occupancy rate; and
an amount of data of the data set.

8. The method according to claim 1, wherein the obtaining the data set corresponding to the query request and storing the data set in the external memory comprises:
storing context information corresponding to the query request in the external memory;
reading the context information from the external memory;
using the context information to obtain the data set corresponding to the query request; and
storing the data set in the external memory.

9. The method according to claim 8, wherein the storing the context information corresponding to the query request in the external memory comprises:
parsing parameter information carried in the query request and determining whether the parameter information exists in a parameter table, the parameter table recording parameter information for caching; and
in response to determining that the parameter information exists, storing the context information corresponding to the query request in the external memory.

10. The method according to claim 9, wherein the method further comprises:
receiving a database creation request, the database creation request carrying the parameter information for caching, and recording the parameter information carried in the database creation request to the parameter table;
receiving a table group creation request, the table group creation request carrying the parameter information for caching, and recording the parameter information carried in the table group creation request to the parameter table; or
receiving a table creation request, the table creation request carrying the parameter information for caching, and recording the parameter information carried in the table creation request to the parameter table.

11. The method according to claim 8, wherein the reading the context information from the external memory comprises:
determining a priority corresponding to the context information using the context information in the external memory;

sorting the context information in the external memory by using the priority corresponding to the context information; and reading context information with a highest priority from the external memory according to a sorting result.

12. The method according to claim 11, wherein:

the context information comprises a receiving time of the query request and a predicted amount of data corresponding to the query request; and the determining the priority corresponding to the context information using the context information in the external memory comprises:

determining a waiting time corresponding to the context information using a difference between a current time and the receiving time; and determining the priority corresponding to the context information according to the waiting time and the predicted amount of data.

13. The method according to claim 12, wherein the determining the priority corresponding to the context information according to the waiting time and the predicted amount of data comprises:

performing a normalization treatment on the waiting time to obtain a first sub-weight;

performing a normalization treatment on the predicted amount of data to obtain a second sub-weight;

obtaining a first weight value according to the first sub-weight and the second sub-weight; and obtaining the priority corresponding to the context information according to the first weight value, wherein the larger the first weight value is, the higher the priority is, and the smaller the first weight value is, the lower the priority is.

14. The method according to claim 8, wherein the reading the data set from the external memory comprises:

in response to determining that a sorting of data sets is performed in an order of priority of from high to low, reading top N data sets from the external memory according to the sorting result of the data sets; or in response to determining that the sorting of data sets is performed in an order of priority of from low to high, reading bottom N data sets from the external memory according to the sorting result of the data sets, wherein:

N is a positive integer greater than or equal to 1; and a sum of the resource occupation information corresponding to the N data sets and currently occupied resources of the front-end server is less than a resource threshold.

15. The method according to claim 8, wherein:

the context information comprises the query request; and the using the context information to obtain the data set corresponding to the query request comprises:

generating a scheduling request corresponding to the query request;

sending the scheduling request to a computing server; and receiving the data set corresponding to the scheduling request returned by the computing server.

16. One or more computer readable media storing thereon computer-readable instructions that, when executed by one or more processors, cause the one or more processors to perform acts comprising:

receiving a query request sent by a client;

determining resource occupation information of a data set corresponding to the query request;

in response to determining to cache the query request according to the resource occupation information, obtaining the data set corresponding to the query request and storing the data set in an external memory;

reading the data set from the external memory;

sending the data set to the client;

obtaining a processing time corresponding to the query request, the processing time being a time period from when the query request is received to when the data set is sent to the client; and adjusting a resource threshold according to the processing time corresponding to the query request, the adjusting the resource threshold according to the processing time corresponding to the query request including:

determining that the processing time corresponding to the query request is greater than a preset first time threshold; and increasing a value of the resource threshold, the increased resource threshold being not greater than an upper limit of the resource threshold.

17. The one or more computer readable media according to claim 16, wherein the determining the resource occupation information of the data set corresponding to the query request including:

querying a mapping table through a data identifier carried in the query request to obtain the resource occupation information of the data set corresponding to the data identifier, the mapping table recording a corresponding relationship between the data identifier and the resource occupation information.

18. A device comprising:

one or more processors; and one or more computer readable media storing thereon computer-readable instructions that, when executed by the one or more processors, cause the one or more processors to perform acts comprising:

receiving a query request sent by a client;

determining resource occupation information of a data set corresponding to the query request;

in response to determining to cache the query request according to the resource occupation information, obtaining the data set corresponding to the query request, the obtaining the data set corresponding to the query request including:

storing context information corresponding to the query request in an external memory, the context information including the query request;

reading the context information from the external memory;

using the context information to obtain the data set corresponding to the query request, the using the context information to obtain the data set corresponding to the query request including:

generating a scheduling request corresponding to the query request;

sending the scheduling request to a computing server; and receiving the data set corresponding to the scheduling request returned by the computing server; and storing the data set in the external memory; and reading the data set from the external memory.

19. The device according to claim 18, wherein the reading the data set from the external memory comprises:

in response to determining that a sorting of data sets is performed in an order of priority of from high to low, reading top N data sets from the external memory according to the sorting result of the data sets; or in response to determining that the sorting of data sets is performed in an order of priority of from low to high, reading bottom N data sets from the external memory according to the sorting result of the data sets, wherein:

N is a positive integer greater than or equal to 1; and a sum of the resource occupation information corresponding to the N data sets and currently occupied resources of the front-end server is less than a resource threshold.

* * * * *